US010663729B2

(12) United States Patent
Kazansky et al.

(10) Patent No.: US 10,663,729 B2
(45) Date of Patent: May 26, 2020

(54) PERIPHERAL DEVICE FOR HEAD-MOUNTED DISPLAY

(71) Applicant: DAQRI, LLC, Los Angeles, CA (US)

(72) Inventors: Lucas Kazansky, Los Angeles, CA (US); Christopher Michaels Garcia, Whittier, CA (US); Michael Kozlowski, Los Angeles, CA (US); Xuan Wang, Monterey Park, CA (US); Bernhard Jung, Perchtoldsdorf (AT); Matthias Kalkgruber, Vienna (AT); Daniel Wagner, Vienna (AT)

(73) Assignee: DAQRI, LLC, Los Angeles, CA (US)

(*) Notice: Subject to any disclaimer, the term of this patent is extended or adjusted under 35 U.S.C. 154(b) by 162 days.

(21) Appl. No.: 15/699,507

(22) Filed: Sep. 8, 2017

(65) Prior Publication Data

US 2018/0074329 A1 Mar. 15, 2018

Related U.S. Application Data

(60) Provisional application No. 62/488,538, filed on Apr. 21, 2017, provisional application No. 62/395,226, filed on Sep. 15, 2016.

(51) Int. Cl.
*G02B 27/01* (2006.01)
*H04N 5/225* (2006.01)
(Continued)

(52) U.S. Cl.
CPC ..... *G02B 27/0172* (2013.01); *G02B 27/0093* (2013.01); *G02B 27/0176* (2013.01); *G06F 3/012* (2013.01); *G06F 3/013* (2013.01); *G06F 3/0325* (2013.01); *G06F 3/0488* (2013.01); *G06F 3/04815* (2013.01); *G06F 3/04842* (2013.01); *G06T 19/006* (2013.01); *H04N 5/2256* (2013.01); *G02B 2027/014* (2013.01);
(Continued)

(58) Field of Classification Search
None
See application file for complete search history.

(56) References Cited

U.S. PATENT DOCUMENTS

2010/0079356 A1 4/2010 Hoellwarth
2011/0090135 A1 4/2011 Tricoukes et al.
(Continued)

OTHER PUBLICATIONS

"U.S. Appl. No. 15/699,494, Non Final Office Action dated May 31, 2019", 10 pgs.

*Primary Examiner* — David D Davis
(74) *Attorney, Agent, or Firm* — Schwegman Lundberg & Woessner, P.A.

(57) ABSTRACT

A head-mounted display (HMD) system includes an HMD device wearable upon a head of a user, and a peripheral device that is dockable with the HMD device. The peripheral device comprises a plurality of light source elements disposed along a perimeter of a face of the peripheral device and a peripheral electronic control system. The peripheral electronic control system is configured to form an optically detectable light pattern with the plurality of light source elements by controlling each of the light source elements. The HMD device is configured to detect the optically detectable light pattern with a camera and to display an augmented reality (AR) content based on the identified optically detectable light pattern.

20 Claims, 12 Drawing Sheets

(51) Int. Cl.
*G06F 3/0484* (2013.01)
*G06T 19/00* (2011.01)
*G06F 3/0481* (2013.01)
*G06F 3/01* (2006.01)
*G06F 3/03* (2006.01)
*G06F 3/0488* (2013.01)
*G02B 27/00* (2006.01)
*G06F 3/044* (2006.01)
*G06F 3/02* (2006.01)
*H04N 5/33* (2006.01)

(52) U.S. Cl.
CPC .............. *G02B 2027/019* (2013.01); *G02B 2027/0138* (2013.01); *G02B 2027/0156* (2013.01); *G02B 2027/0187* (2013.01); *G06F 3/02* (2013.01); *G06F 3/044* (2013.01); *H04N 5/33* (2013.01)

(56) References Cited

U.S. PATENT DOCUMENTS

| | | | |
|---|---|---|---|
| 2013/0305437 A1* | 11/2013 | Weller | A42B 3/0406 |
| | | | 2/422 |
| 2015/0084840 A1 | 3/2015 | Kim et al. | |
| 2015/0241969 A1 | 8/2015 | Elangovan et al. | |
| 2015/0281680 A1* | 10/2015 | Grafenberg | A61B 6/4441 |
| | | | 348/50 |
| 2015/0364113 A1 | 12/2015 | Ahn et al. | |
| 2016/0063767 A1 | 3/2016 | Lee et al. | |
| 2016/0133201 A1* | 5/2016 | Border | G02B 27/283 |
| | | | 345/694 |
| 2017/0017085 A1* | 1/2017 | Araki | G09G 5/00 |
| 2017/0059871 A1 | 3/2017 | Hashiba et al. | |
| 2018/0074599 A1 | 3/2018 | Garcia et al. | |
| 2019/0056590 A1* | 2/2019 | Chuang | H04N 13/344 |
| 2019/0066315 A1* | 2/2019 | Bleyer | G06T 7/49 |

* cited by examiner

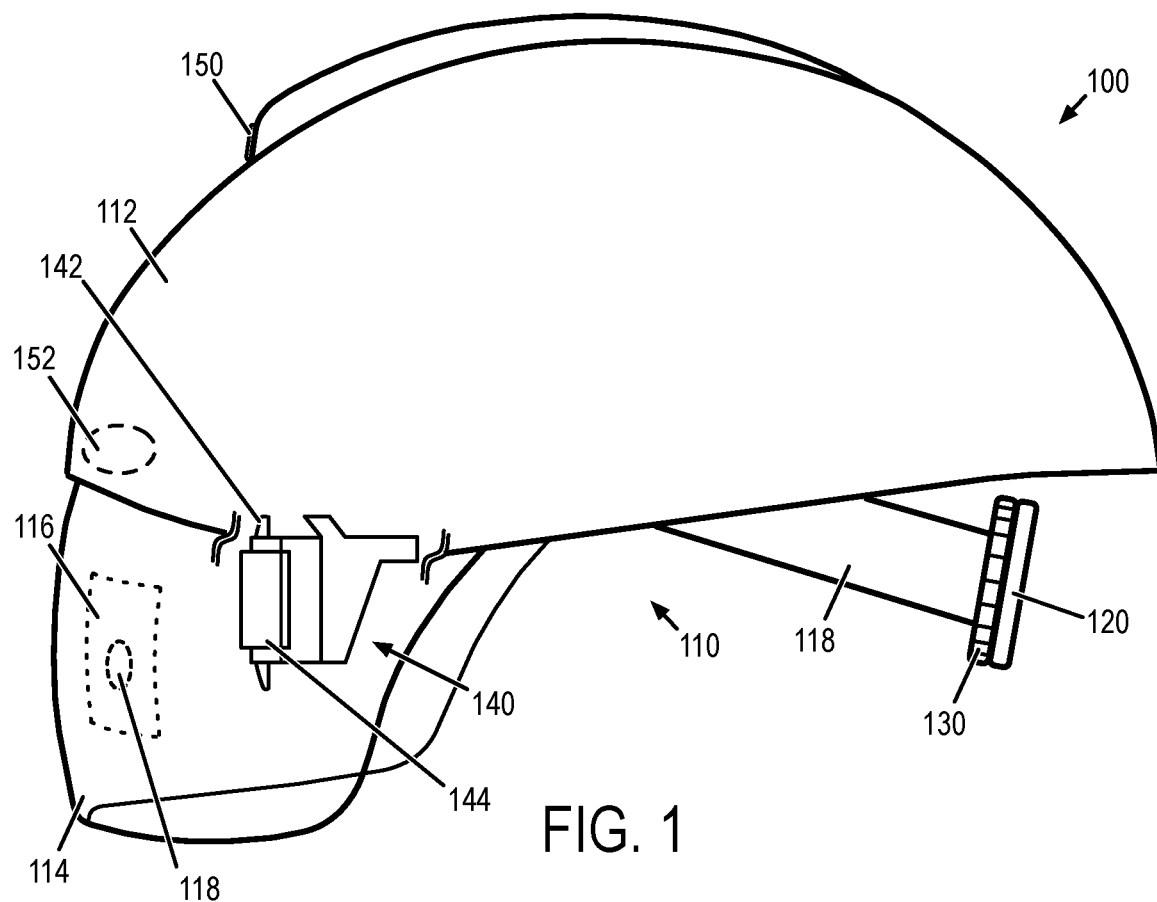
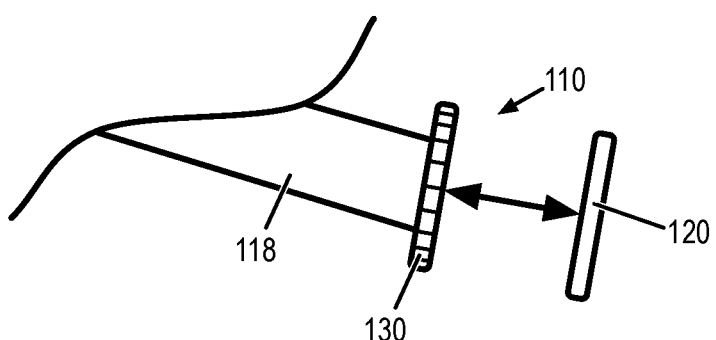

| LIGHT SOURCE | PATTERN 1740 | PATTERN 1742 | PATTERN 1744 | PATTERN 1746 | PATTERN 1748 | PATTERN 1750 | PATTERN 1752 |
|---|---|---|---|---|---|---|---|
| 1710 | ON | OFF | ON | FREQ. = X | FREQ. = Y | FREQ. = X | FREQ. = X |
| 1712 | ON | OFF | OFF | FREQ. = X | FREQ. = Y | FREQ. = Y | FREQ. = Y |
| 1714 | ON | OFF | ON | FREQ. = X | FREQ. = Y | FREQ. = X | ON |
| 1716 | ON | OFF | OFF | FREQ. = X | FREQ. = Y | FREQ. = Y | OFF |
| 1718 | ON | OFF | ON | FREQ. = X | FREQ. = Y | FREQ. = X | FREQ. = X |
| 1720 | ON | OFF | OFF | FREQ. = X | FREQ. = Y | FREQ. = Y | FREQ. = Y |
| 1722 | ON | OFF | ON | FREQ. = X | FREQ. = Y | FREQ. = X | ON |
| 1724 | ON | OFF | OFF | FREQ. = X | FREQ. = Y | FREQ. = Y | OFF |

PERIPHERAL DEVICE FOR HEAD-MOUNTED DISPLAY

RELATED APPLICATION

This application claims the benefit of priority of U.S. Provisional Application No. 62/395,226, filed Sep. 15, 2016, and U.S. Provisional Application No. 62/488,538, filed Apr. 21, 2017, which are herein incorporated by reference in their entirety.

TECHNICAL FIELD

The subject matter disclosed herein generally relates to a peripheral device for a head-mounted display (HMD) system. Specifically, the present disclosure addresses systems that constitute, include, or interface with peripheral device and methods for operating the peripheral device.

BACKGROUND

Head-mounted display (HMD) devices are wearable by a human subject (i.e., user) for the purpose of presenting graphical content to the user. This graphical content may take the form of augmented reality (AR) content, virtual reality content (VR), and/or non-aligned heads-up-display (HUD) content.

AR typically refers to machine-based augmentation of a person's sensory perception of a physical, real-world environment. Within the context of visual augmented reality, a person's view of the real-world environment is supplemented or otherwise altered by computer-generated graphical content to create the appearance that the graphical content is present within the real-world environment. Head-mounted display devices for AR often incorporate one or more see-through display panels upon which graphical content is displayed to the user, enabling the user to directly view both the real-world environment and the graphical content within a combined AR view. Other head-mounted display devices for AR may capture a live view of the real-world environment via an on-board camera, and present that live view via a graphical display along with computer-generated graphical content integrated with the live view.

Virtual reality typically refers to machine-based replacement of a person's sensory perception with computer-generated content. Head-mounted display devices for visual VR may fully occlude the user's field of view with one or more graphical display devices upon which graphical content is presented to provide the user with a VR view. VR may seek to fully separate the user from the real-world environment in contrast to head-mounted displays that provide a live or direct view of the real-world environment.

Non-aligned HUD content refers to graphical content that is presented on a see-through display panel. While in general, HUD content may include AR content, non-aligned HUD content is not visually aligned with the user's field of view within the real-world environment. Hence, in contrast to more specific forms of AR content, non-aligned HUD content includes graphical content that is not necessarily presented in a manner that creates the appearance of the graphical content being present within the real-world environment. Non-aligned HUD content may take the form of human-readable information that provides the user with contextual information, for example.

BRIEF DESCRIPTION OF DRAWINGS

Some embodiments are illustrated by way of example and not limitation in the figures of the accompanying drawings.

FIG. 1 depicts an example head-mounted display (HMD) system.

FIG. 2 depicts a peripheral device in an undocked configuration relative to an HMD device of the HMD system of FIG. 1.

DETAILED DESCRIPTION

Figure 3:
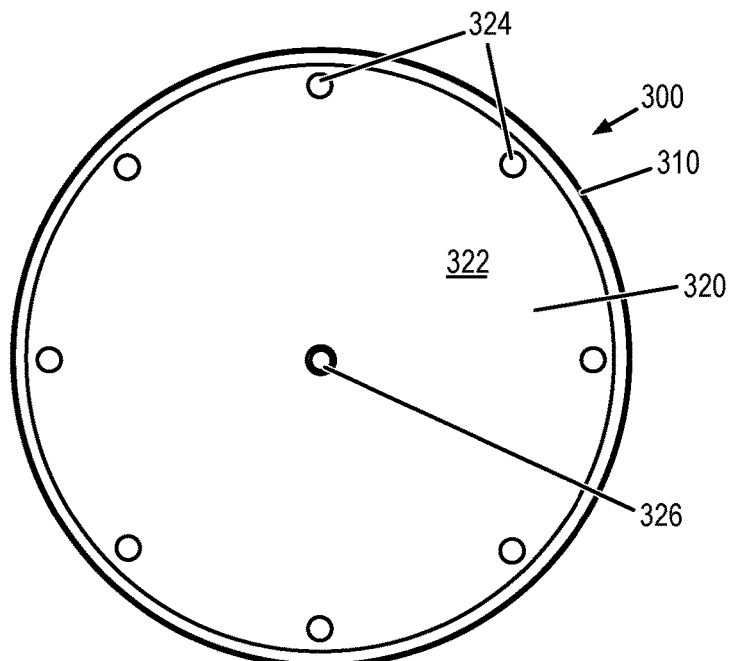
FIGS. 3-5 depict an example peripheral device.

FIG. 1 depicts an example head-mounted display (HMD) system 100. HMD system 100 includes an HMD device 110 and a peripheral device 120 that is dockable with HMD device 110. In FIG. 1, peripheral device 120 is depicted in a docked configuration with HMD device 110. HMD device 110 is wearable upon a head of a human subject (i.e., user).

FIG. 2 depicts peripheral device 120 in an undocked configuration relative to HMD device 110. Peripheral device 120 may be transitioned from an undocked configuration to a docked configuration with HMD device 110 by a user establishing a set of physical electronic connections (e.g., one or more physical electronic connection) between an electronic connector of the HMD device 110 and a corresponding electronic connector of the peripheral device 120. Peripheral device 120 may be transitioned from a docked configuration to an undocked configuration by a user removing the peripheral device from HMD device 110 to terminate the set of physical electronic connections between the electronic connectors of the peripheral and HMD devices. In the undocked configuration, for example, the set of physical electronic connections are not established between the electronic connectors of the HMD device 110 and the peripheral device 120.

As will be described in further detail herein, the HMD device 110 and the peripheral device 120 may be operated in a variety of different modes depending on whether the HMD and peripheral devices are in the docked configuration or the undocked configuration relative to each other. As an example, the peripheral device 120, when undocked from the HMD device 110, may serve as a handheld remote control device that enables a user to interact with the HMD device 110 over a wireless communication link established between the HMD device 110 and the peripheral device 120. Here, for example, in the undocked configuration the peripheral device 120 transmits, via a wireless interface, wireless communications indicating user input received via a user input interface of the peripheral device for reception by the HMD device 110.

As another example, when undocked from the HMD device 110, the peripheral device 120 may include one or more on-board sensors by which measurement data may be obtained and reported to the HMD device 110 over a wireless communication link established between the HMD device 110 and the peripheral device 120. Here, for example, in the undocked configuration, the peripheral device 120 transmits wireless communications including the measurement data for reception by the HMD device 110.

As yet another example, when docked with the HMD device 110, the peripheral device 120 may communicate and/or exchange electrical power with the HMD device 110 via their respective electronic connectors over the set of physical electronic connections that establish one or more wired links between devices. Additional modes of operation that may vary between docked and undocked configurations will be described in further detail herein, including a dwell mode for identifying user input, and an optical signaling mode for signaling user state or for tracking the peripheral device, as additional examples.

Referring back to FIG. 1, HMD device 110, in this example, takes the form of a helmet 112 that is wearable by a user. Helmet 112 includes a transparent or see-through visor 114 that enables the user to view a real-world environment through the visor. However, HMD device 110 may take other suitable forms, such as a headband, glasses, hat, or other suitable wearable form factor.

HMD device 110 includes a see-through graphical display system 140 (i.e., a see-through display) having one or more see-through display panels upon or within which computer-generated graphical content (e.g., an AR object or a non-aligned HUD object) may be presented to a user while wearing the HMD device. In some examples, HMD device 110 may include two or more see-through display panels or two or more independent display regions of a common see-through display panel, to provide independent graphical displays to each eye of the user.

Figure 15:
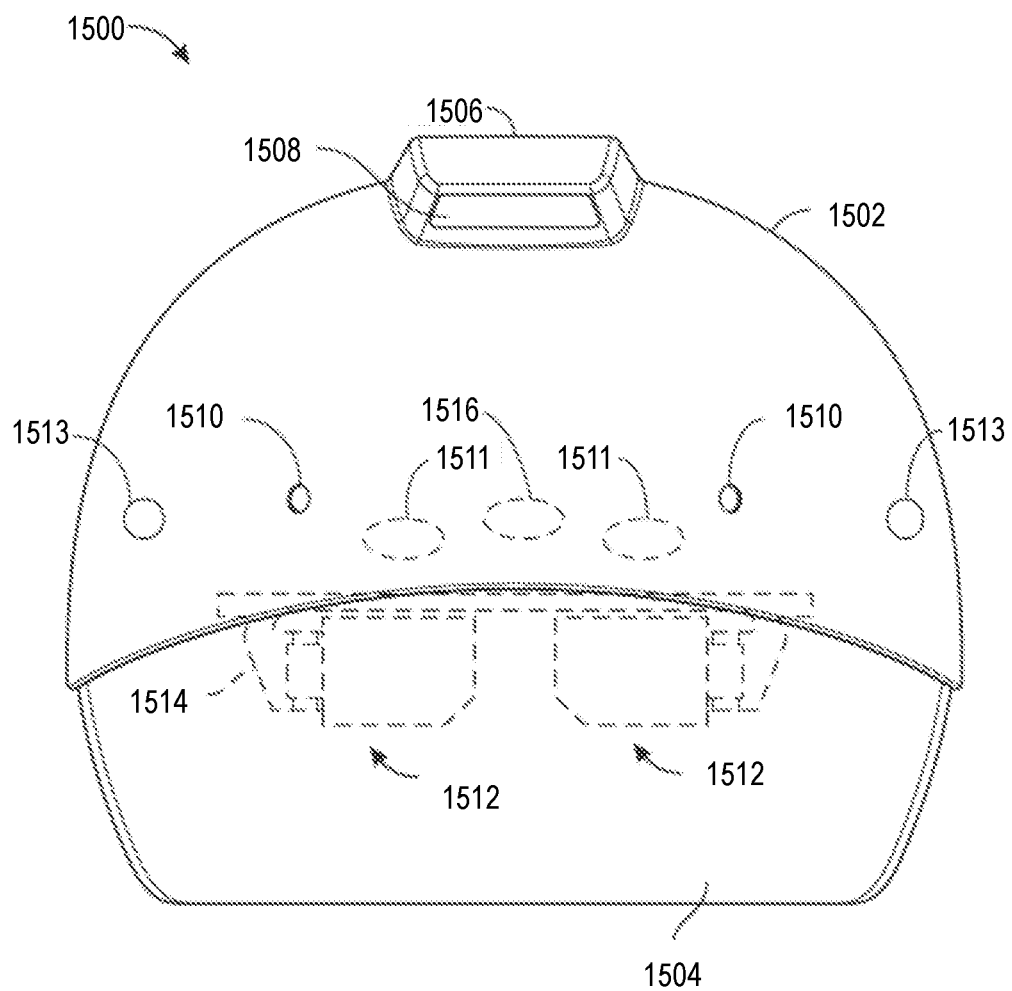
FIG. 15 depicts additional aspects of an example HMD device.

In a first example, see-through graphical display system 140 may include two side-by-side see-through display panels 142 corresponding to a right eye and a left eye of the user. FIG. 15 depicts additional aspects of this example configuration. Alternatively a single see-through display panel 142 may have two side-by-side display panel regions corresponding to a right eye and left eye of the user. See-through display panel(s) 142 may include or take the form of reflective optical waveguides that receive light projected by one or more light projectors 144, and reflect or otherwise direct at least a portion of that light towards the eyes of the user. For example, each display panel or display panel region thereof may receive light from a respective light projector. See-through display panel(s) 142 may additionally or alternatively include or take the form of lenses that reflect or otherwise direct at least a portion of the light received from light projector(s) 144 towards the eyes of the user.

In a second example, see-through graphical display system 140 may omit see-through display panel(s) 142, and one or more see-through display panels may be instead integrated into visor 114. One or more display regions (indicated schematically at 116) of visor 114 may each include or take the form of a reflective optical waveguide that receives light projected by one or more light projector(s) 144, and reflects that light back towards the eye or eyes of the user. The relative positioning of light projector(s) 144 in FIG. 1 is represented schematically with respect to see-through display panel(s) 142. As such, it will be understood that light projector(s) 144 may reside at other suitable positions for projecting light onto or into see-through display panel(s) 142, or alternatively onto or into see-through display region(s) 116 of visor 114.

A user, while wearing HMD device 110, is permitted to view the real-world environment through the see-through display panel(s) of see-through graphical display system 140. Graphical content, such as represented schematically at 118 within the context of a visor-integrated see-through display panel, may optionally be presented by the HMD device. This graphical content may be sized and/or positioned relative to physical objects within the real-world environment to provide the appearance of the graphical content being present within the real-world environment. Within this context, the graphical content may be referred to as augmented reality (AR) content, since the graphical content augments the user's perception of the real-world environment. Alternatively or additionally, graphical content presented via the see-through graphical display may take the form of informational content that is not necessarily aligned with physical objects within the real-world environment. Within this context, the graphical content may be referred to as non-aligned heads-up display (HUD) content. AR content and non-aligned HUD content may be presented to the user at the same time, or at different times and independently of each other, depending on implementation or context.

HMD device 100 may further include a variety of on-board sensors. As a non-limiting example, HMD device 100 may include optical sensors, such as a forward facing camera 150 and an ocular camera 152. Forward facing camera 150 may be configured and otherwise oriented to capture at least a portion of a field of view (some, all, or a greater field of view) of the user as the HMD device is worn upon the head of the user. Images or other optical sensor measurements captured by forward facing camera 150 may be used by the HMD device, for example, to assist in aligning AR content with physical features present within the real-world environment. Ocular camera 152 may be oriented generally rearwards, towards an eye of the user. Images or other optical sensor measurements captured by ocular camera 152 may be used by the HMD device, for example, to track a gaze direction of the user's eye or to otherwise measure features of the user's eye.

While HMD devices are described herein within the context of see-through displays that provide a direct view of the real-world environment, it will be understood that the methods and techniques described herein may be implemented within the context of HMD devices that do not include a see-through display, but instead provide a live view of the real-world environment via an on-board camera (e.g., forward facing camera 150) and a head-mounted graphical display.

Peripheral device 120 may be docked with HMD device 110 at any suitable location of the HMD device. In this example, the docking location of the peripheral device is located on a rear-facing side of HMD device 110, opposite the forward-facing side having the see-through display panel(s) and/or visor. This docking location may vary with the form factor of the HMD device, and may be implementation-dependent. In this example, HMD device 110 includes a head strap 132 that is adjustable to fit the size of the user's head. Peripheral device 120 interfaces with HMD device 110 via a peripheral dock 130. In this example, peripheral dock 130 may be integrated with a rotary adjustment knob or wheel for adjusting a sizing of head strap 132. However, it will be understood that this configuration is a non-limiting example of a peripheral dock implementation.

Figure 4:
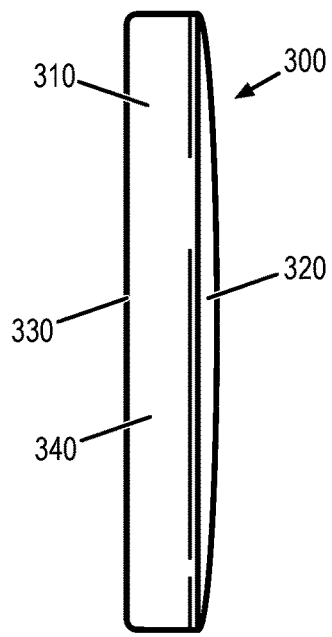
Figure 5:
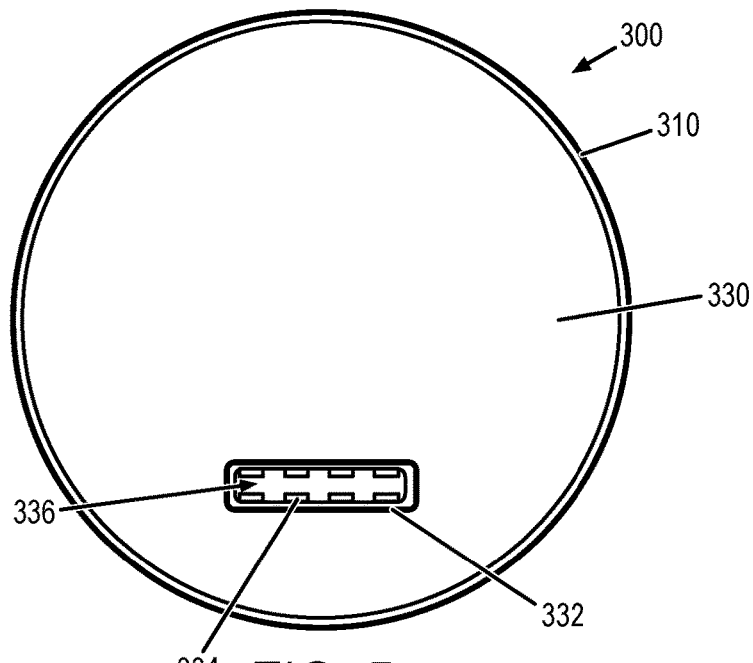

FIGS. 3-5 depict an example peripheral device 300. Peripheral device 300 is a non-limiting example of previously described peripheral device 120 of FIGS. 1 and 2. FIG. 3 depicts a view of a front face 320 of device body 310. FIG. 4 depicts a view of a side of device body 310 in which front face 320, a rear face 330, and side surfaces 340 of the device body are visible. FIG. 5 depicts a view of the rear face 330 of device body 310.

Peripheral device 300 includes a device body 310. Device body 310 takes the form of a circular-shaped disk having a relatively flat device body in relation to its width or diameter. However, it will be understood that this circular-shaped disk is a non-limiting example of a form factor of a peripheral device, as other suitable form factors may be used within the context of the present disclosure.

Peripheral device 300 may take the form of a hand-held peripheral device in at least some examples. Within the context of the depicted circular-shaped disk, device body 310 may have a width or diameter of between approximately 2-3 inches for hand-held implementations. This size enables a typically-sized hand of a user to hold the peripheral device with rear face 330 facing an open palm or open hand of the user, while also enabling a thumb of the same hand to reach and touch all or most of the front face 320.

Front face 320 may include or incorporate a user input interface 322. Interface 322 may include or incorporate a touch-sensitive interface, such as a capacitive touch interface, for example. Additionally or alternatively, interface 322 may include or incorporate one or more depressible physical buttons. Interface 322 may span the entirety of front face 320 or a portion thereof. As an example, interface 322 may combine a capacitive touch interface with a depressible physical button to detect one or more physical points or regions of contact of interface 322—e.g., by a user's finger, thumb, stylus, etc., while also enabling the user to perform selections by depressing the physical button.

In at least some implementations, a peripheral device for an HMD system may include one or more light source elements. In this example, peripheral device 300 includes light source elements 324. Light source elements 324 may take the form of IR LEDs in an example. In the example depicted in FIG. 3, the peripheral device includes eight light source elements that visible along front face 320. Light source elements may be located along other faces or surfaces of the peripheral device, depending on implementation. Within the context of HMD system 100 of FIG. 1, front face 320 of peripheral device 300 when docked with the HMD device faces rearwards, and light source elements 324 may be visible on a rear side of the user's head.

As will be described in further detail herein, light source elements 324 located on-board the peripheral device and/or light source elements located on-board the HMD device may be operated according to an optical signaling protocol to visually indicate information (e.g., user state) between the peripheral device and the HMD device, and/or between two or more similarly configured HMD systems. Furthermore, light source elements of the peripheral device may assist the HMD device in tracking a positioning of the peripheral device, for example, to align AR content with the peripheral device as described in further detail with reference to FIG. 8. These light source elements may reside below an exterior surface of the peripheral device and/or HMD device that is transparent or translucent to permit light to pass through the exterior surface. For example, in FIG. 3, light source elements may reside below an exterior surface formed by user input interface 322.

In at least some implementations, a peripheral device for an HMD system may include one or more optical sensors. In this example, peripheral device 300 includes an optical sensor in the form of a camera 326. In the example depicted in FIG. 3, camera 326 is located along front face 320. A camera or other optical sensor may be located along other faces or surfaces of the peripheral device, depending on implementation. Within the context of HMD system 100 of FIG. 1, front face 320 of peripheral device 300 when docked with the HMD device faces rearwards, and camera 326 provides a field of view of the real-world environment from a perspective of the rear of the user's head. Optical sensors, such as example camera 326 may reside below an exterior surface of the peripheral device that is transparent or translucent to permit light to pass through the exterior surface. For example, in FIG. 3, camera 326 may reside below an exterior surface formed by user input interface 322.

Rear face 330 may include or incorporate a electronic connector 332. Electronic connector 332 may include a plurality of electrical contacts 334 by which an electrical ground reference, electrical power, and/or electronic data signals may be exchanged with corresponding electrical contacts of a electronic connector of an HMD device, such as the previously described HMD device 110 of FIGS. 1 and 2. Here, electrical power may be transmitted/received over at least some of the set of physical electronic connections established between the electronic connectors, electronic data signals may be transmitted/received over at least some of the set of physical electronic connections established between the electronic connectors, and an electrical ground reference may be exchanged across or established between at least some of the set of physical electronic connections established between the electronic connectors.

In an example, corresponding electronic connectors of the HMD device and the peripheral device each include a plurality of electrical contacts that support at least a ground reference connection, an electrical power connection, and a data connection of the set of physical electronic connections between the HMD device and the peripheral device in the docked configuration. These electronic connectors may support any suitable quantity of independent data connections, for example, to provide many parallel data connections over which communications between the HMD device and the peripheral device may be transmitted or received.

In the example depicted in FIG. 5, electronic connector 332 takes the form of a female electronic connector having a female-side receptacle 336. In another example, electronic connector 332 may take the form of a male electronic connector having a male-side protrusion that corresponds to a female-side receptacle of the HMD device. Electronic connector 332 is depicted in simplified form in FIG. 5. Electronic connector 332 may include any suitable quantity and configuration of electrical contacts depending on implementation. Electronic connector 332 may take the form of an industry standard electrical connector in some examples. Non-limiting examples of industry standard electrical connectors include: USB Type-C, Micro-USB, etc. that support power, ground, and/or data connections.

Electronic connector 332 and/or portions of rear face 330 may include or incorporate magnets (e.g., rare earth magnets) and/or magnetically attractive materials that cooperate with corresponding magnets and/or magnetically attractive materials of a corresponding electronic connector of the HMD device. These magnets and/or magnetically attractive materials may assist in aligning and/or retaining the electrical connectors in a docked configuration in which all electrical contacts are bridged across the connector interface between the HMD device and the peripheral device.

Figures 6, 7:
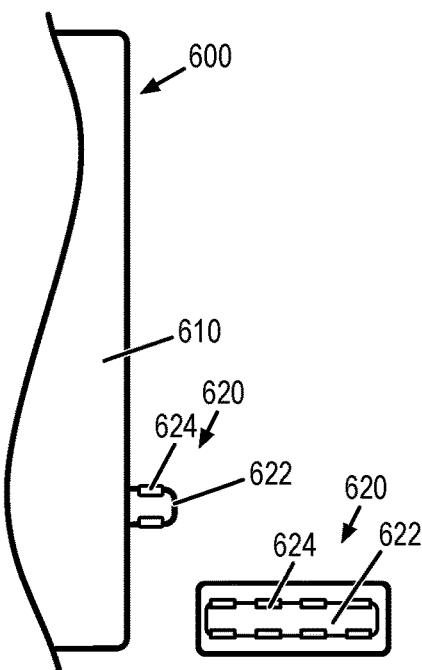
FIG. 6 depicts a side view of an example interface region of a peripheral device.
FIG. 7 depict a front view of an example interface region of a peripheral dock of an HMD device.

FIGS. 6 and 7 depict aspects of an example interface region 600 of a peripheral dock of an HMD device, such as may be used for HMD device 110 of FIG. 1. Interface region 600 may correspond to a portion of peripheral dock 130 of FIG. 1, for example. FIG. 6 depicts a front view of an interface region 600 including an electronic connector 620 that corresponds to and interfaces with electronic connector 332 of peripheral device 300 of FIG. 5. FIG. 7 depicts a front view of electronic connector 620.

In this example electronic connector 620 takes the form of a male electronic connector having a male-side protrusion 622 and a plurality of electrical contacts 624 thereon. Protrusion 622 may be inserted into receptacle 336, for example, so that electrical contacts 624 contact and engage with electrical contacts 334 of electronic connector 332, thereby establishing a set of physical electrical connections across the HMD-peripheral interface. In other examples, electronic connector 620 may take the form of a female electronic connector, and electronic connector 332 may take the form of a male electronic connector.

Figure 8:
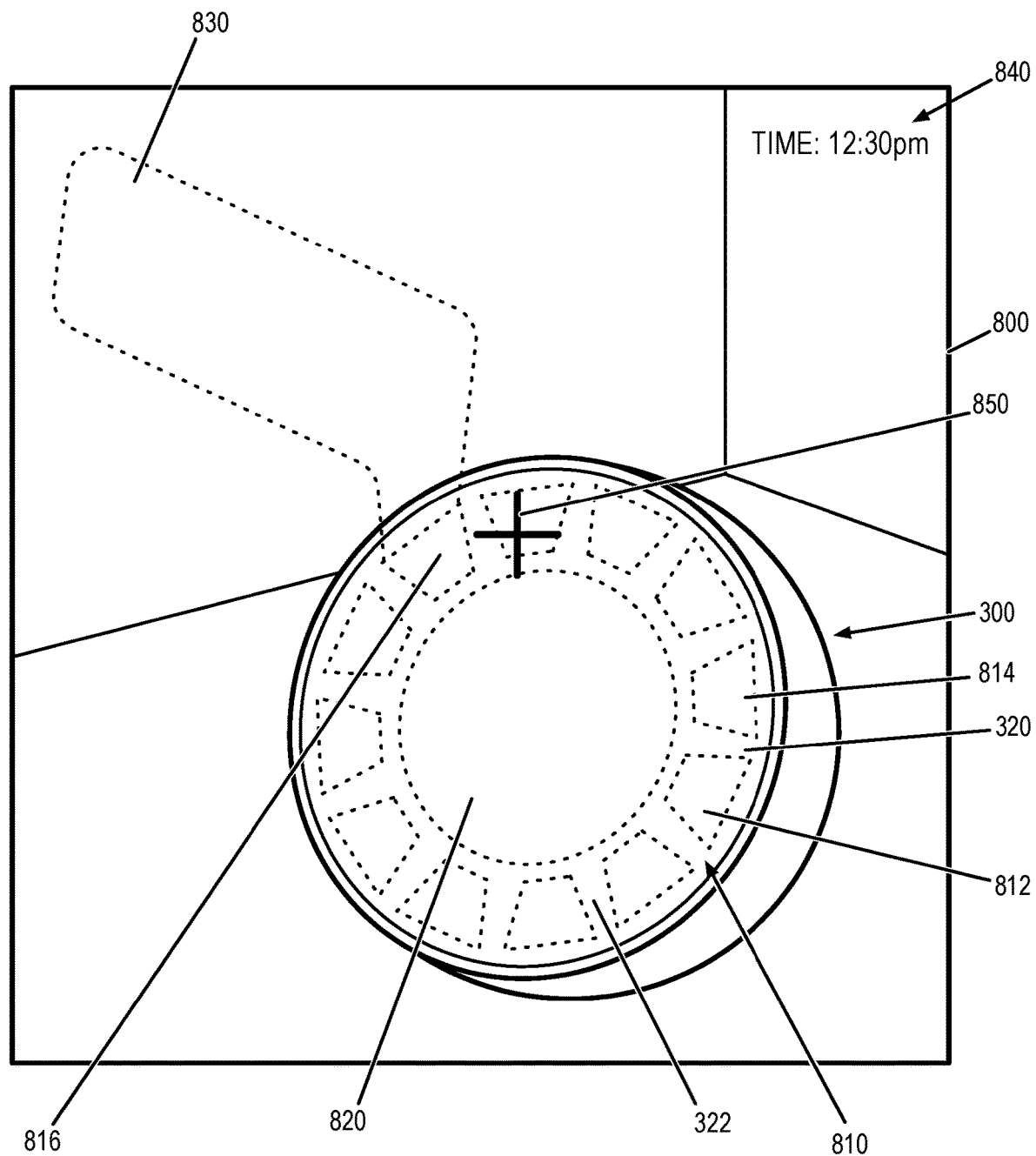
FIG. 8 depicts an example use-scenario in which the peripheral device of FIG. 3 is viewed by a user within an AR view via a see-through display panel of an HMD device.

FIG. 8 depicts an example use-scenario in which peripheral device 300 of FIGS. 3-5 is viewed by a user within an AR view 800 of a real-world environment via a see-through display panel of an HMD device. Peripheral device 300 is in an undocked configuration from the HMD device that is presenting AR view 800, in this use-scenario.

Front face 320 of peripheral device 300 is generally facing the user in the example depicted in FIG. 8. As an example, the user has undocked peripheral device 300 of the HMD device, and has brought the peripheral device into the user's field of view represented by AR view 800. Peripheral device 800 may, for example, be held in a hand of the user or may be resting on a surface of a physical object.

The HMD device is presenting graphical content within AR view 800 in the form of AR content, including AR content objects 810. Each of these AR objects may include a multi-dimensional graphical object (e.g., a two or three-dimensional object) having a six degree-of-freedom (6DOF) positioning (e.g., X, Y, Z values within a coordinate system) and/or orientation (e.g., yaw, pitch, roll values within a coordinate system) within AR view 800. Each of these AR objects may further include or incorporate human readable or perceivable information, such as text, icons, colors, etc.

AR objects 810 are visually overlaid upon and/or aligned with physical objects within the real-world environment within AR view 800. As an example, AR objects 812, 814, 816, etc. are radially distributed (e.g., with other AR objects) along a perimeter of front face 320 and overlay different regions of user input interface 322. Here, AR objects 810 includes a collection of twelve equally distributed AR objects of which AR objects 812, 814, and 816 are members. However, it will be understood that other quantities and configurations of AR objects may be used, depending on implementation. As another example, AR object 820 takes the form of a circular AR object that is centered within front face 320 and overlays another region of user input interface 322.

AR objects, such as 812, 814, 816, etc. may be overlaid upon a user input interface to provide a visual indication of where user input may be directed by the user to select or otherwise activate a particular function or action that is to be implemented by the HMD system. In this example, AR object 812 is overlaid upon a region of user input interface 322 that, when interacted with by the user, indicates a user selection of the underlying function, thereby directing the HMD system to initiate or perform that function. Here, a user's interaction with user input interface 322 may take the form of physically touching the user input interface within the region that is overlaid by an AR object to initiate selection of the associated function (e.g., in the case of the user input interface being a touch-sensitive user input interface), followed by the user depressing the user input interface (e.g., in the case of the user input interface also incorporating a physical button) to complete the selection. A user may select a different function to be implemented by the HMD system by interacting with different AR objects, such as 814, 816, etc. The example circular configuration of AR objects with respect to peripheral device 300 may provide the user with a palette of selectable functions that are within reach of the user's thumb, for example. Again, it will be understood that other suitable configurations may be used, depending on implementation.

As yet another example, AR object 830 takes the form of an information bubble, tag, or window that extends outwards from peripheral device 300 and outside the bounds of front face 320. In this example, AR object 830 is tied to and aligned with AR object 816 that is overlaid upon a region of user input interface 322. AR object 830 may be used to present additional information relating to AR object 816, for example. In at least some implementations, AR object 830 associated with AR object 816 may be summoned by the user for presentation by the HMD device via an AR view in response to the user contacting user input interface within the region overlaid by AR object 816. The user may summon additional information bubbles, tags, or windows associated with AR objects 812, 814, 816, etc. by contacting the user input interface within the respective regions overlaid by these AR objects.

In contrast to optical detection techniques used by some HMD devices to detect user interaction with AR content, the peripheral device in this example receives user input via a physical user input interface, and the detected user input may be transmitted back to the HMD device via a wireless communications link. While this physical user input interface 322 is described within the context of a touch-sensitive interface and/or depressible button, it will be understood that other suitable physical user input interfaces may be incorporated into a peripheral device of an HMD system.

Also within AR view 800, an example of a non-aligned HUD object 830 is depicted. Item 830 is not aligned with or to physical objects of the real-world environment, and is provided as a contrasting example of the differences between aligned AR content and non-aligned HUD content, generally. Alignment of AR content within a live, direct view of a real-world environment within the context of a HMD system will be described in further detail with reference to FIG. 16.

In at least some implementations, a see-through display panel or visor of the HMD device may include a reticle or other suitable sighting indicator (indicated schematically at 850) that aids the user in selection of graphical content presented via the see-through display. In a first example, the reticle may take the form of a physical sighting indicator that is present upon or within the see-through display panel or visor of the HMD device. In a second example, the reticle may take the form of a graphical object presented via the see-through display panel of the HMD device, typically in a fixed position (e.g., as a non-aligned HUD object).

The reticle, in combination with inertial sensors on-board the HMD device, may provide the user with the ability to point to and select an AR object that is presented via the see-through display. The dwell mode disclosed herein enables the user to select an AR object by aiming the reticle at the AR object, and maintaining that aim upon the AR object for at least a threshold period of time. In other implementations where eye tracking is performed by the HMD device via an ocular camera to determine a gaze vector of the user's eye, the reticle may be optionally omitted. Here, a sighting axis at a center of the reticle represented at 850 may instead refer to an axis of the user's gaze vector identified via an ocular camera. In these implementations, the dwell mode disclosed herein enables the user to select an AR object by looking at the AR object such that the user's gaze vector intersects the AR object, and maintaining the gaze vector upon the AR object for at least a threshold period of time.

Figure 9:
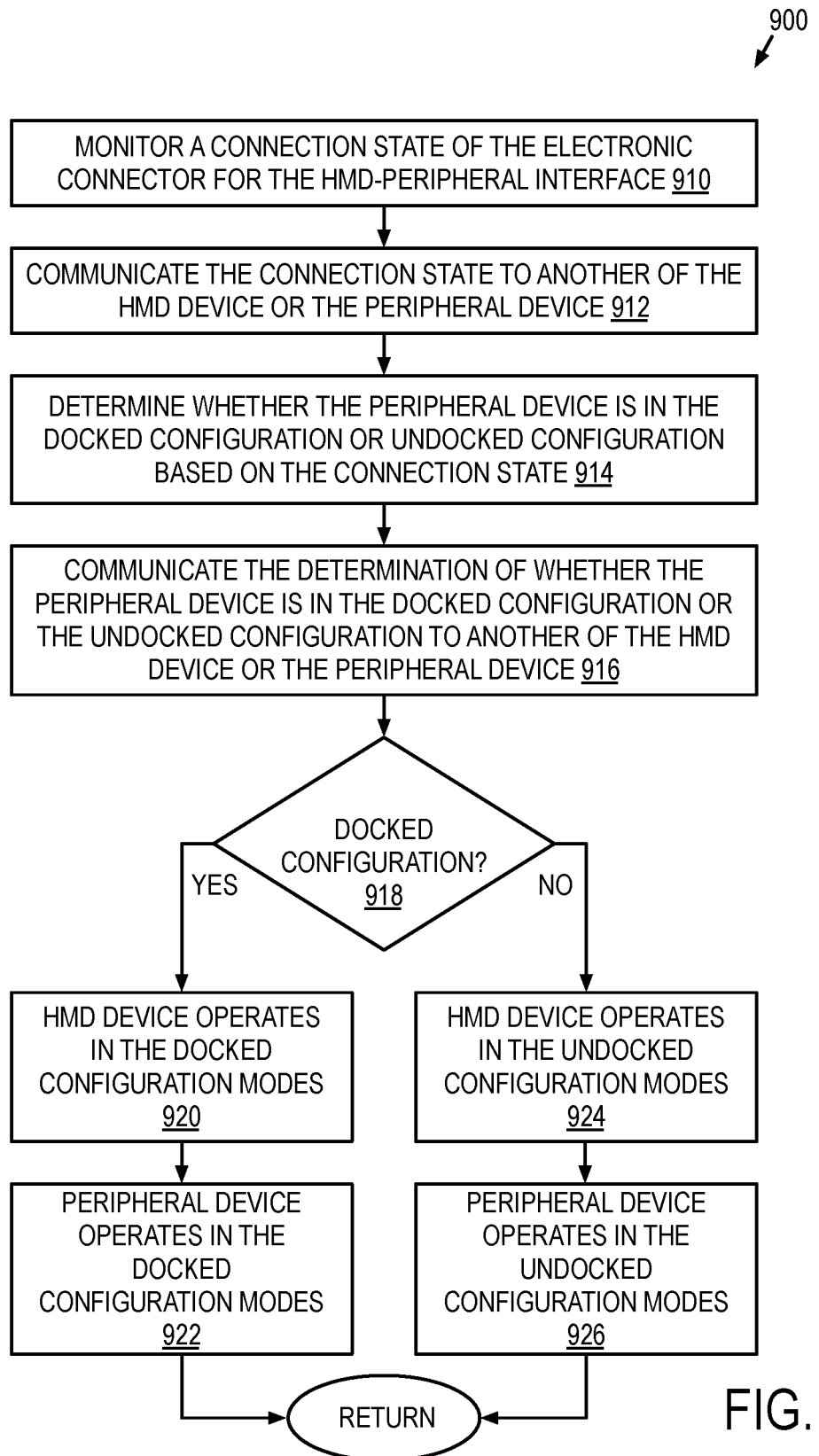
FIG. 9 is a flow diagram depicting an example method associated with varying operation of an HMD device and/or a peripheral device based on and responsive to a connection state of a electronic connector for an HMD-peripheral interface.

FIG. 9 is a flow diagram depicting an example method 900 associated with varying operation of an HMD device and/or a peripheral device based on and responsive to a connection state of a electronic connector for an HMD-peripheral interface.

At 910, the method includes monitoring a connection state of the electronic connector for the HMD-Peripheral interface between the HMD device and the peripheral device. As an example, the docked configuration is determined to exist if all physical electronic connections are established across the HMD-peripheral interface between their respective electronic connectors. The undocked configuration is determined to exist if no physical electronic connections are established across the HMD-peripheral interface between their respective electronic connectors. However, at least in some implementations, partially docked configurations may be supported in which operational modes relying a particular set of physical electronic connections may be activated if those electronic connections are established across the HMD-peripheral interface, while additional operational modes relying on another set of physical electronic connections that are not fully established across the HMD-peripheral interface may result in these additional operational modes being deactivated.

Monitoring at 910 may be performed by the HMD device, by the peripheral device, or independently by both the HMD device and peripheral device. As an example, an electronic control system of the HMD device may monitor a connection state of a set of physical electronic connections at the electronic connector of the HMD device, and may determine whether the peripheral device is in the docked configuration or the undocked configuration based on the connection state of the set of physical electronic connections. As another example, an electronic control system of the peripheral device may monitor a connection state of a set of physical electronic connections at the electronic connector of the peripheral device, and may determine whether the peripheral device is in the docked configuration or the undocked configuration based on the connection state of the set of physical electronic connections.

At 912, the method includes communicating the connection state to another of the HMD device or the peripheral device. For example, if the HMD device performed the monitoring for the connection state at 910, then the HMD device may communicate the connection state to the peripheral device. However, if the peripheral device performed the monitoring for the connection state at 910, then the peripheral device may communicate the connection state to the HMD device.

At 914, the method includes determining whether the peripheral device is in a docked configuration or an undocked configuration based on the connection state. Operation 914 may be performed by the same device that monitors the connection state, or may be performed by another device of the HMD system that receives an indication of the connection state from monitoring device. Furthermore, in at least some implementations, the peripheral device and/or the HMD device may infer that the devices are in an undocked state by receiving a wireless communication from another of the devices following previous wired communications over the electronic connectors of the HMD-peripheral interface.

At 916, the method includes communicating the determination of whether the peripheral device is in the docked configuration or the undocked configuration to another of the HMD device or the peripheral device. For example, if the HMD device performed the determination of the docked or undocked configuration at 914, then the HMD device may communicate the determination to the peripheral device. However, if the peripheral device performed the determination of the docked or undocked configuration at 914, then the peripheral device may communicate the determination to the HMD device.

At 918, if the peripheral device is determined to be in the docked configuration, the method includes the HMD device operating in the docked configuration modes at 920, and the peripheral device operating in the docked configuration modes at 922. These various modes will be described in further detail with reference to FIG. 12.

If at 918, however, the peripheral device is not determined to be in the docked configuration or is determined to be in the undocked configuration, the method includes the HMD device operating in the undocked configuration modes at 924, and the peripheral device operating in the undocked configuration modes at 926. These various modes will be described in further detail with reference to FIG. 11. From 922 or 926, the method may include returning to 910 or other suitable operation of method 600.

Figure 10:
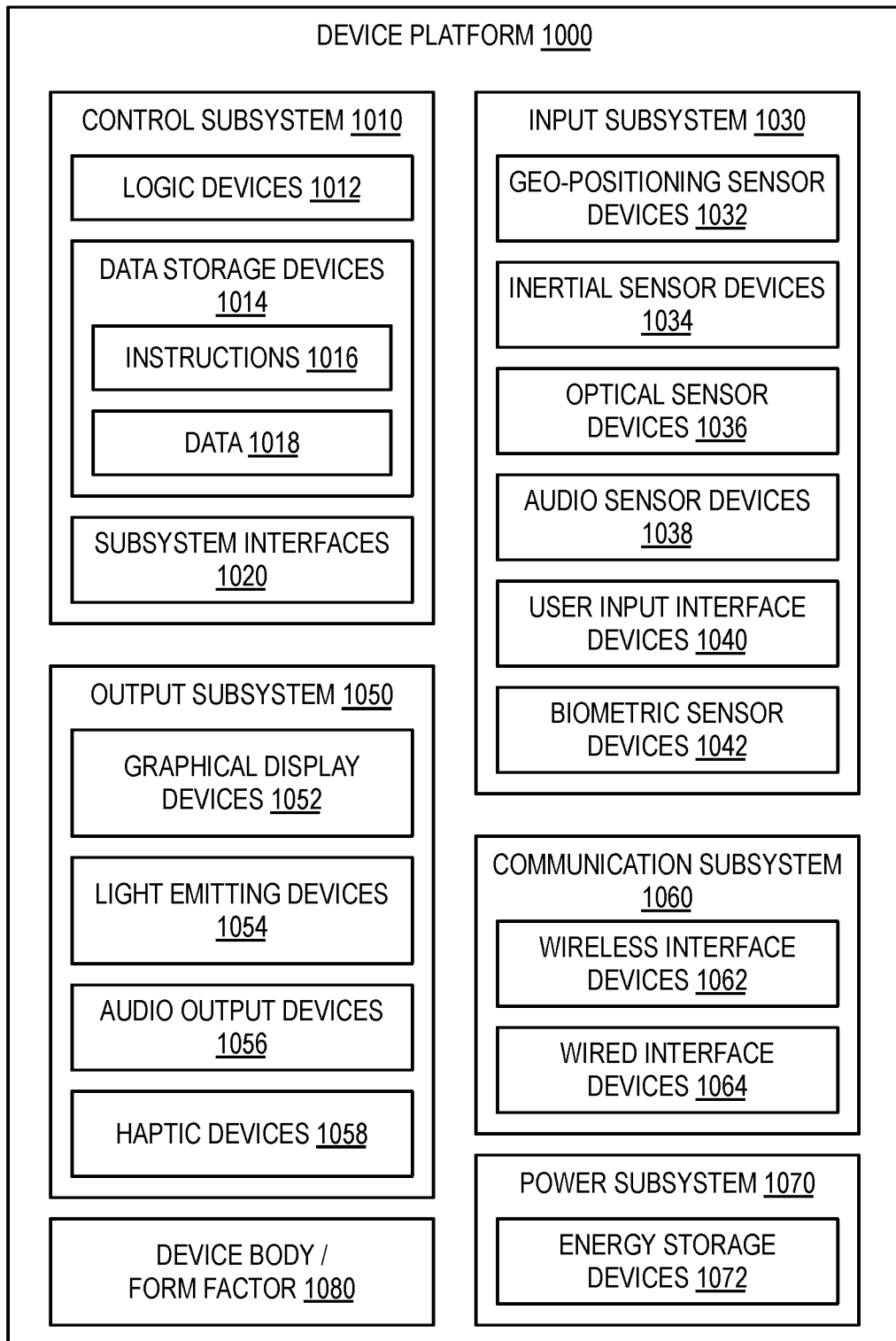
FIG. 10 is a schematic diagram depicting an example device platform, which may refer to an HMD device, a peripheral device, or an HMD system that includes an HMD device and a peripheral device.

FIG. 10 is a schematic diagram depicting an example device platform 1000. Device platform 1000 may refer to an HMD device, such as any of the example HMD devices described herein. Device platform 1000 may also refer to a peripheral device, such as any of the example peripheral devices described herein. In at least some implementations, aspects of device platform 1000 may be distributed across an HMD device and a peripheral device of an HMD system, such as any of the example HMD systems described herein.

Device platform 1000 may include an electronic control subsystem 1010. Within the context of device platform 1000 referring to an HMD device, control subsystem 1010 or a portion thereof may be referred to as an HMD electronic control system. Within the context of device platform 1000 referring to a peripheral device, control subsystem 1010 or a portion thereof may be referred to as a peripheral electronic control system.

In at least some implementations, control subsystem 1010 may take the form of a computing device or computing system, or a logic component thereof. Control subsystem 1010 may include one or more logic devices 1012, and one or more data storage devices 1014. Data storage devices 1014 may include instructions 1016 and/or data 1018 stored thereon. Control subsystem 1010 may be referred to as being programmed with instructions 1016 held in data storage device 1014 that are executable by the one or more logic devices 1012 of the electronic control system.

Within the context of device platform 1000 referring to an HMD device, instructions 1010 or a portion thereof may be referred to as HMD instructions. As an example, HMD instructions may include a graphics rendering engine or module (among other instruction components) that renders graphical content (e.g., AR objects) for presentation (i.e., display) via one or more see-through displays of the HMD device. As another example, HMD instructions may include a computer vision engine or module that processes images captured via a forward facing camera of the HMD device to identify physical objects within a real-world environment. As yet another example, HMD instructions may include an eye tracking engine or module that processes images of an eye of the user captured via a rearward facing camera to identify a gaze vector of the user. Within the context of device platform 1000 referring to a peripheral device, instructions 1010 or a portion thereof may be referred to as peripheral instructions.

Logic devices 1012 include one or more physical logic devices configured to execute instructions, such as instructions 1016. Instructions 1016 are executable by logic device 1012 to implement or otherwise perform the various methods or operations described herein. For example, logic devices 1012 may be configured to execute instructions that are part of one or more applications, services, programs, routines, libraries, objects, components, data structures, or other logical constructs. Such instructions may be implemented to perform a task or function, implement a data type, transform the state of one or more components, achieve a technical effect, or otherwise arrive at a desired result.

Logic devices 1012 may include one or more processors configured to execute software instructions of instructions 1016. Additionally or alternatively, logic devices 1012 may include one or more hardware or firmware logic machines configured to execute hardware or firmware instructions of instructions 1016. Processors of logic devices 1012 may be single-core or multi-core, and the instructions of instructions 1016 executed thereon may be configured for sequential, parallel, and/or distributed processing. Individual components of logic devices 1012 may be distributed among two or more separate devices (e.g., an HMD device and a peripheral device of an HMD system), which may be remotely located and/or configured for coordinated processing. Aspects of logic devices 1012 may be virtualized and executed by remotely accessible, networked computing devices configured in a cloud-computing configuration.

Data storage devices 1014 include one or more physical memory devices (e.g., non-transitory memory devices) configured to hold instructions executable by logic devices 1012 to implement the methods or operations described herein. When such methods or operations are implemented, a state of data storage devices 1014 may be transformed—e.g., to hold different data (e.g., of data 1018). Data storage devices 1014 may include removable and/or built-in devices. Data storage devices 1014 may include optical memory devices, semiconductor memory devices, and/or magnetic memory devices, among other suitable forms. Data storage devices 1014 may include volatile, nonvolatile, dynamic, static, read/write, read-only, random-access, sequential-access, location-addressable, file-addressable, and/or content-addressable devices.

Aspects of logic devices 1012 and data storage devices 1014 may be integrated together into one or more hardware-logic components. While data storage devices 1014 includes one or more physical devices, aspects of the instructions described herein alternatively may be, at times, propagated by a communication medium (e.g., an electromagnetic signal, an optical signal, etc.) that is not held by a physical device for a finite duration.

Control subsystem 1010 may include one or more subsystem interfaces 1020 by which the control subsystem is operatively coupled with the various other subsystems and subcomponents of device platform 1010. Subsystem interfaces 1020 may include or incorporate a computer bus, in an example, over which these various subsystems may communicate, share electrical power resources and electrical ground references, or otherwise interact with each other.

Device platform 1000 may include an input subsystem 1030. Some or all of the components of input subsystem 1030 may reside on-board the HMD device, depending on implementation. Furthermore, some or all of the components of input subsystem 1030 may reside on-board the peripheral device, depending on implementation.

Input subsystem 1030 may include one or more geo-positioning sensor devices 1032. Examples of geo-positioning sensor devices 1032 include a GNSS (e.g., GPS) receiver and processing components, a magnetometer, a compass, or other suitable geo-positioning sensors. Input subsystem 1030 may include one or more inertial sensor devices 1034. Examples of inertial sensor devices 1034 include an accelerometer (e.g., a multi-axis accelerometer), a gyroscope, or other suitable inertial sensor devices or inertial measurement units (IMUs). The geo-positioning sensor devices and/or the inertial sensor devices may be collectively used by the electronic control system of the device platform or a remote device to determine a six degree-of-freedom (6DOF) positioning of the device platform within three-dimensional space. 6DOF positioning may refer to a three-dimensional position (e.g., X, Y, Z values) and an orientation (e.g., yaw, pitch, roll values) within a coordinate system.

Input subsystem 1030 may include one or more optical sensor devices 1036. Examples of optical sensor devices 1030 include cameras, ambient light sensors, or other suitable optical sensor devices. In an example, a HMD device may include a forward facing camera that captures a field of view of the user and a rearward facing camera that captures an eye of the user. In another example, a peripheral device for an HMD system may include a camera that captures a rearward facing field of view when docked with the HMD device, and provides a mobile camera platform when undocked from the HMD device.

Input subsystem 1030 may include one or more audio sensor devices 1038. Examples of audio sensor devices 1038 include a microphone, a piezoelectric sensor, etc. Input subsystem 1030 may include one or more user input interface devices 1040. Examples of user interface device 1040 include a touch-sensitive user input interface, such as a capacitive touch-sensitive interface, a physical button, a physical switch, or other suitable user input interface devices. Input subsystem 1030 may include one or more biometric sensor devices 1042. Examples of biometric sensor device 1043 include Electroencephalography (EEG) sensor devices, Electrocardiography (ECG) sensor devices, or other suitable biometric sensor devices.

Device platform 1000 may include an output subsystem 1050. Some or all of the components of output subsystem 1050 may reside on-board the HMD device, depending on implementation. Furthermore, some or all of the components of output subsystem 1050 may reside on-board the peripheral device, depending on implementation.

Output subsystem 1050 may include one or more graphical displays devices 1052 to present graphical content. Examples of graphical display devices 1052 include see-through graphical displays of an HMD device or HMD system, a backlit graphical display device, a touch-sensitive graphical display device, a graphical projection device, or other suitable graphical display device.

Output subsystem 1050 may include one or more light emitting devices 1054. Examples of light emitting devices 1054 include an LED that outputs visible and/or infrared light or electromagnetic radiation, an incandescent light bulb, or other suitable light emitting device. Output subsystem 1050 may include one or more audio output device 1056. Examples of audio output devices 1056 include audio speakers, piezoelectric drivers, or other suitable audio output device. Output subsystem 1050 may include one or more haptic devices 1058. Examples of haptic devices 1058 include a vibration motor, a vibration driver, or other suitable haptic and/or kinesthetic communication devices.

Device platform 1000 may include a communication subsystem 1060. Some or all of the components of communication subsystem 1060 may reside on-board the HMD device, depending on implementation. Furthermore, some or all of the components of communication subsystem 1060 may reside on-board the peripheral device, depending on implementation.

Communication subsystem 1060 may include one or more wireless interface devices 1062 to transmit and/or receive wireless communications. Examples of wireless interface devices include a wireless receiver, a wireless transmitter, or a wireless transceiver, as well as associated processing components. Wireless interface devices 1062 may support wireless communications over any suitable wireless protocol, such as Wi-Fi, Bluetooth, RFID, NFC, LTE, etc., over personal area network, local area network, and/or wide area network. Wireless interface devices 1062 may utilize radio frequency and/or other suitable wireless frequency ranges, as well as electromagnetic fields in the case of RFID, to communicate wireless with other computing devices or electronic hardware.

Communication subsystem 1060 may include one or more wired interface devices 1064. Examples of wireless interface devices include electronic connectors and associated processing hardware. Such electronic connectors may include support for exchanging an electrical ground reference, electrical power, and/or data/signal connections with a corresponding electronic connector of another device.

Device platform 1000 may include a power subsystem 1070. Some or all of the components of power subsystem 1070 may reside on-board the HMD device, depending on implementation. Furthermore, some or all of the components of power subsystem 1070 may reside on-board the peripheral device, depending on implementation.

Power subsystem 1070 may include one or more energy storage devices 1072, such as one or more batteries for power the platform device and its various subsystems without requiring physical connection to an external power source. Power subsystem 1070 may further include an electronic connector for receiving electrical power of external power sources, as well as power conditioning and/or processing components.

Device platform 1000 may include a device body 1080 having any suitable form factor, depending on implementation, for mounting and/or enclosing the various subsystems and their components. FIGS. 1-7 depict non-limiting examples of HMD device and peripheral device form factors. However, other suitable form factors may be used, depending on implementation.

Figure 11:
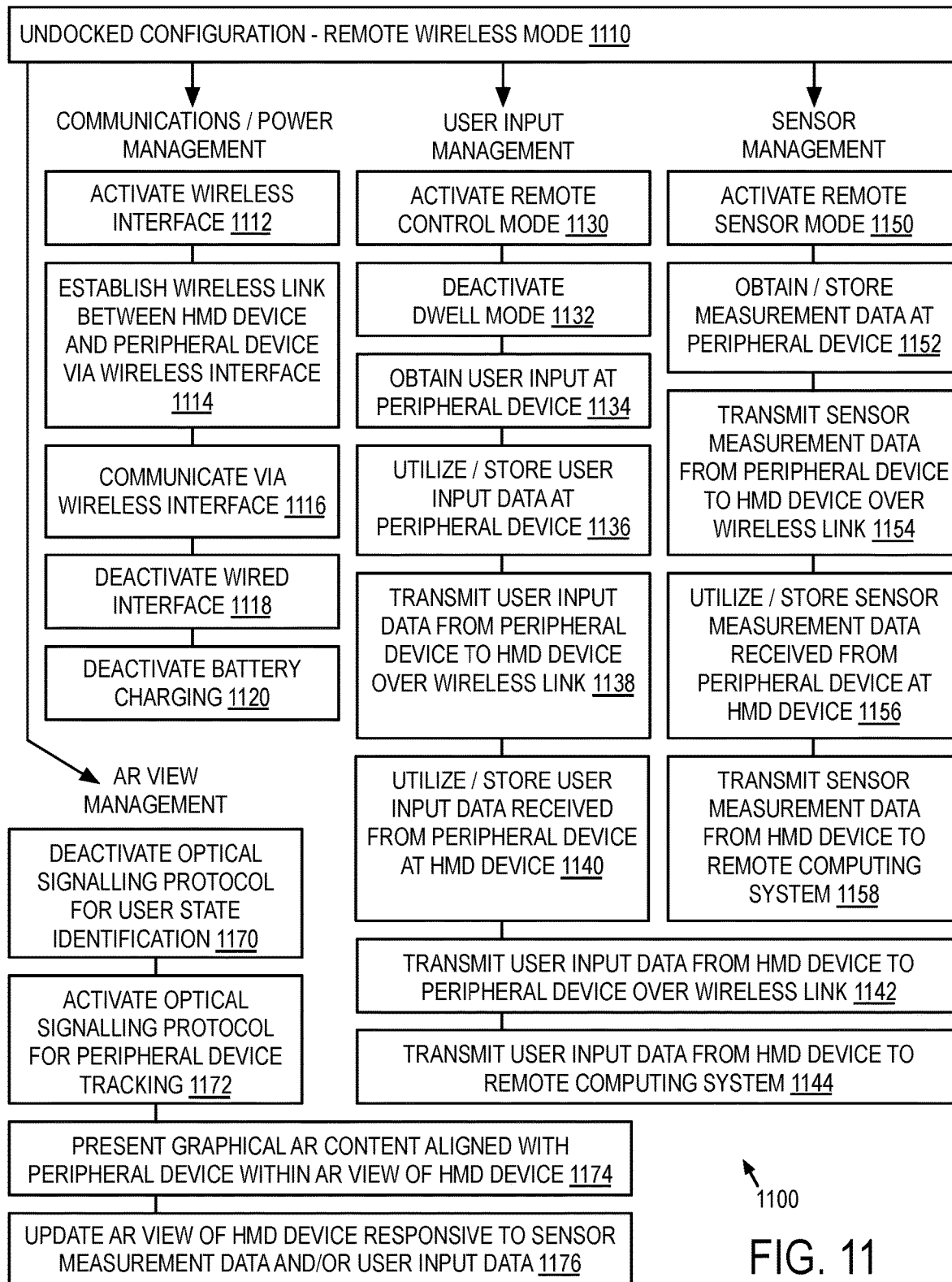
FIG. 11 is a flow diagram depicting an example method associated with an undocked configuration between an HMD device and a peripheral device.

FIG. 11 is a flow diagram depicting an example method 1100 associated with an undocked configuration between an HMD device and a peripheral device. This undocked configuration may be detected by the HMD device and/or the peripheral device. In response to detecting the undocked configuration, the HMD device and/or the peripheral device may implement a remote wireless mode 1110. Remote wireless mode 1110 may include a variety of operational components, including communications/power management, user input management, sensor management, and AR view management.

Communications/power management may include activating a wireless interface at 1112, establishing a wireless communication link between the HMD device and the peripheral device via the wireless interface at 1114, communicating via the wireless interface at 1116. Communications/power management may include deactivating the wired interface at 1118. Communications/power management may include deactivating battery charging at 1120.

User input management may include activating a remote control mode at 1130. The remote control mode activated at 1130 may include the peripheral device transmitting user input data to the HMD device over a wireless link, as will be described in further detail with reference to operations 1134 and 1138, for example.

User input management may include deactivating a dwell mode at 1132. As will be described in further detail with reference to FIG. 13, the dwell mode, when activated, directs the HMD device to identify a sighting axis of a reticle of the HMD device or a gaze vector (e.g., of an eye of a user wearing the HMD device) dwelling upon an AR object presented by the HMD device (e.g., via the see-through graphical display) for at least a threshold period of time as indicating a user input directed at the AR object. This gaze vector may be identified by the HMD device imaging the eye of the user via an ocular camera of the HMD device, for example. With regards to operation 1132, an electronic control system of the HMD device may deactivate the dwell mode in the undocked configuration in which the HMD does not identify the sighting axis of the reticle or the gaze vector dwelling upon the AR object for at least the threshold period of time as indicating the user input directed at the AR object. With the dwell mode deactivated, the HMD may receive user input via a user input interface of the peripheral device or via other suitable user input interface of the HMD device or additional peripheral devices that are interfaced with the HMD device. This dwell mode may be activated by the HMD device in the docked configuration, as will be described with reference to FIG. 12.

User input management may include obtaining user input at the peripheral device at 1134. The user input obtained at 1134 may take the form of user input data within an electronic control system of the peripheral device. User input management may include utilizing and/or storing the user input data at a data storage device of the peripheral device at 1136. Utilizing the user input data may include varying an operation of the peripheral device based on the user input data and/or processing the user input data at the peripheral device into a processed form of such data.

User input management may include transmitting the user input data or processed forms thereof from the peripheral device to the HMD device over the wireless link at 1138. Here, an electronic control system of the peripheral device may transmit wireless communications including the user input data or processed forms thereof via a wireless interface of the peripheral device for reception by the HMD device.

User input management may include utilizing and/or storing the user input data received from the peripheral device at the HMD device at 1140. Here, an electronic control system of the HMD device may receive wireless communications transmitted by the peripheral device via a wireless interface of the HMD device, and may store the user input data indicated by the wireless communications received from the peripheral device in a data storage device of the HMD device and/or may utilize the user input data at the HMD device. Utilizing the user input data may include varying an operation of the HMD device in response to the user input data and/or processing the user input data at the HMD device into a processed form of such data.

User input management may include transmitting user input data obtained via user input interfaces of the HMD device or processed forms of such data from the HMD device to the peripheral device over the wireless link at 1142. Here, an electronic control system of the HMD device obtain user input as user input data via one or more user input interfaces of the HMD device, optionally stores, processes, and/or otherwise utilizes this user input data at the HMD device, and optionally transmits this user input data to the peripheral device over a wireless link.

User input management may include transmitting user input data or processed forms thereof from the HMD device to the HMD device to a remote computing system at 1144. This user input data may include user input data obtained via a user input interface of the HMD device and/or user input data received from the peripheral device over a wireless or wired communication link. Here, an electronic control system of the HMD device may transmit the user input data via a wireless interface or a wired interface of the HMD device to the remote computing system, either directly or via a communication network. The communication network may include a personal area network, a local area network, a wide area network, or a combination thereof.

Sensor management may include activating a remote sensor mode at 1150. The remote control mode activated at 1150 may include the peripheral device transmitting sensor measurement data to the HMD device over a wireless link, as will be described in further detail with reference to operations 1152 and 1154, for example. In the remote sensor mode, the peripheral device in the undocked configuration may be operated by the user as a remote sensor system from the HMD device. For example, sensor management may include obtaining and/or storing sensor measurement data at the peripheral device at 1152. In the undocked configuration, an electronic control system of the peripheral device obtains sensor measurement data from one or more sensors located on-board the peripheral device. Non-limiting examples of these sensors are described in further detail with reference to input subsystem 1030 of FIG. 10. As a non-limiting example, a sensor of the peripheral device includes a camera, and the measurement data obtained via the camera includes one or more images captured by the camera.

The electronic control system of the peripheral device may further store this measurement data obtained via the one or more sensors of the peripheral device in a data storage device of the peripheral device. Measurement data may be time-stamped or otherwise organized in a time-based manner to enable subsequent interpretation of the measurement data by, for example, the HMD device or other remote computing system. The electronic control system of the peripheral device may further associate measurement data obtained via on-board sensors while in the undocked configuration with an identifier that attributes that measurement data to being obtained while undocked from the HMD device. This identifier again enables subsequent interpretation of the measurement data by remote computing systems, such as the HMD device or other remote computing systems.

Sensor management may include transmitting sensor measurement data from the peripheral device to the HMD device over the wireless link at 1154. Here, an electronic control system of the peripheral device may transmit the measurement data over a wireless communications link via a wireless interface of the peripheral device for reception by the HMD device. However, in at least some implementations, wireless transmission of measurement data may not be performed by the peripheral device, at least with respect to certain forms of data, such as large quantities of data representing large data files or other data constructs. Here, the peripheral device may retain the measurement data in a data storage device of the peripheral device until the docked configuration is established between the peripheral device and the HMD device. In the docked configuration, an electronic control system of the peripheral device may transmit the measurement data stored in the data storage device to the HMD device via the electronic connector of the peripheral device over at least some of the set of physical electronic connections with the electronic connector of the HMD device as will be described with reference to operation 1254 of FIG. 12.

Sensor management may include utilizing and/or storing the sensor measurement data received from the peripheral device at the HMD device at 1156. Here, the electronic control system of the HMD device may receive wireless communications transmitted by the peripheral device via a wireless interface of the HMD device, and may store sensor measurement data included in the wireless communications received from the peripheral device in a data storage device of the HMD device and/or may utilize the measurement data at the HMD device. Utilizing the measurement data may include varying an operation of the HMD device based on the measurement data and/or processing the measurement data at the HMD device into a processed form of such data.

As a non-limiting example, the measurement data may take the form of one or more images captured by a camera of the peripheral device. An electronic control system of the HMD device receives the measurement data that includes or represents the one or more images from the peripheral device over the wireless link, optionally stores, and optionally presents the one or more images via the see-through display of the HMD device.

Sensor management may include transmitting sensor measurement data or processed forms thereof from the HMD device to a remote computing system at 1158. This measurement data may include measurement data obtained via sensors on-board the HMD device and/or measurement data received from the peripheral device over a wired or wireless communication link. Here, an electronic control system of the HMD device may transmit the measurement data via a wireless interface or a wired interface of the HMD device to the remote computing system, either directly or via a communication network. The communication network may include a personal area network, a local area network, a wide area network, or a combination thereof.

AR view management may include deactivating an optical signaling protocol associated with a user state signaling mode for user state identification at 1170. As part of this user state signaling mode, a control system of the HMD device and/or a control system of the peripheral device may select or otherwise identify a current user state for the user wearing the HMD device from among a plurality of predefined user states. The current user state may be selected responsive to user input (i.e., a user selection) or may be programmatically selected based on an operating condition detected by the HMD device. This user state signaling mode will be described in further detail with reference to FIG. 14. If the user state signaling mode is activated, the HMD device and/or the peripheral device may activate an optical signaling protocol for signaling the user state in the docked configuration. This optical signaling protocol directs the HMD device and/or the peripheral device to output light from one or more light source elements visible along an exterior of the HMD device and/or peripheral device according to an optically detectable pattern defined by the optical signaling protocol for the current user state. The HMD device and/or the peripheral device may deactivate the optical signaling protocol for signaling the user state in the undocked configuration.

AR view management may include activating an optical signaling protocol associated with a peripheral device tracking mode for tracking the peripheral device at 1172. As part of this peripheral device tracking mode, a control system of the peripheral device may activate the optical signaling protocol for tracking the peripheral device in the undocked configuration. As described in further detail with reference to FIG. 16, this optical signaling protocol directs the peripheral device to output light from one or more light source elements visible along an exterior of the peripheral device according to an optically detectable pattern defined by the optical signaling protocol for tracking the peripheral device. This optical signaling protocol may be optically detected by a camera of the HMD to assist in determining a position and/or orientation of the peripheral device within six degrees of freedom (6DOF).

AR view management may include presenting graphical AR content aligned with the peripheral device within an AR view of the HMD device at 1174. For example, as previously described with reference to FIG. 8, graphical AR objects may be aligned with features of the peripheral device within an AR view presented by the HMD device. AR view management may include updating an AR view of the HMD device responsive to sensor measurement data and/or user input data at 1176. For example, user input directed at a particular AR object within the AR view may summon a menu, dismiss a menu, activate an operational mode, deactivate an operational mode, summon additional AR content, dismiss AR content, etc., depending on implementation and context.

Figure 12:
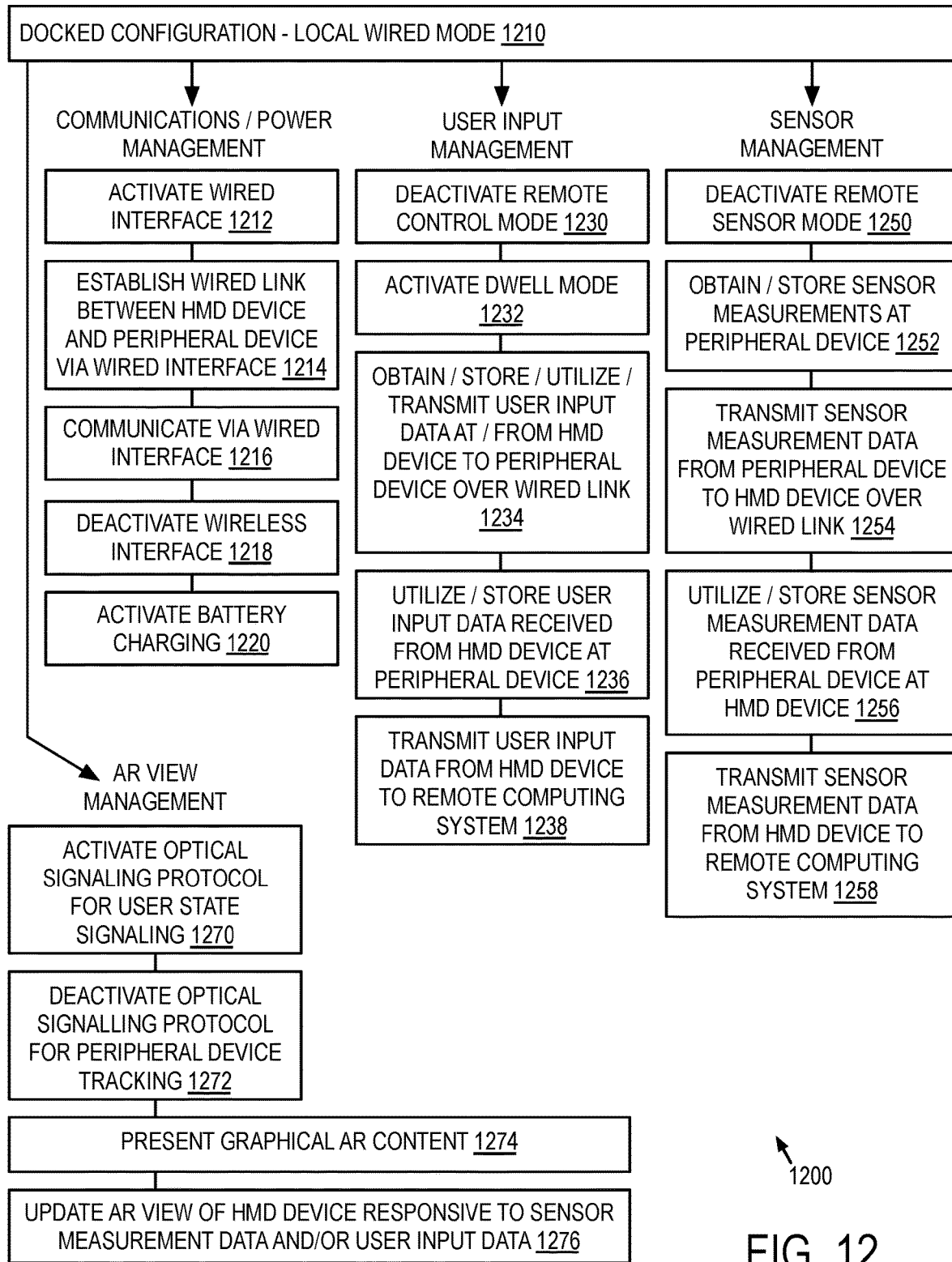
FIG. 12 is a flow diagram depicting an example method associated with a docked configuration between an HMD device and a peripheral device.

FIG. 12 is a flow diagram depicting an example method 1200 associated with a docked configuration between an HMD device and a peripheral device. This docked configuration may be detected by the HMD device and/or the peripheral device. In response to detecting the docked configuration, the HMD device and/or the peripheral device may implement a local wired mode 1210. Remote wireless mode 1210 may include a variety of operational components, including communications/power management, user input management, sensor management, and AR view management.

Communications/power management may include activating a wired interface at 1212. Communications/power management may include establishing a wired link between the HMD device and the peripheral device via the wired interface at 1214. Communications/power management may include communicating via the wired interface at 1216. Communications/power management may include deactivating the wireless interface at 1218.

Communications/power management may include activating battery charging at 1220. Here, the peripheral device may include an electric battery, and an electronic control system of the peripheral device, in the docked configuration, activates charging of the electric battery with electrical power received from the HMD device via the electronic connector of the peripheral device over at least some of the set of physical electronic connections.

User input management may include deactivating a remote control mode at 1230. Deactivation of the remote control mode at 1230 may include or be performed along with deactivation of the optical signaling protocol for peripheral device tracking at 1272. Additionally, with the peripheral device in the docked configuration with the HMD device, the peripheral device is no longer within a field of view of the HMD device. In this example, AR content aligned with the peripheral device in the remote control mode is no longer presented via a see-through display of the HMD device.

User input management may include activating a dwell mode at 1232. As an example, an electronic control system of the HMD device may activate the dwell mode in the docked configuration in which the HMD device identifies the sighting axis of the reticle of the HMD device or the gaze vector of the user's eye dwelling upon an AR object presented by the HMD device for at least a threshold period of time as indicating a user input directed at the AR object.

User input management may include obtaining user input at one or more user input interfaces of the HMD device and/or transmitting user input data from the HMD device to the peripheral device over the wired link at 1234. The user input obtained at 1234 may take the form of user input data within an electronic control system of the HMD device. The HMD device may alternatively or additionally store or utilize user input data at the HMD device, as is typically performed by a standalone computing device.

User input management may include utilizing and/or storing user input data received from the HMD device at the peripheral device at 1236. Here, an electronic control system of the HMD device may store user input data within a data storage device of the HMD device and/or may utilize the user input data at the HMD device. Utilizing the user input data may include varying an operation of the HMD device based on the user input data and/or processing the user input data at the HMD device into a processed form of such data.

User input management may include transmitting user input data or processed forms thereof from the HMD device to a remote computing system at 1238. This user input data may include user input data obtained via a user input interface of the HMD device and/or user input data received from the peripheral device over a wireless or wired communication link. Here, an electronic control system of the HMD device may transmit the user input data via a wireless interface or a wired interface of the HMD device to the remote computing system, either directly or via a communication network. The communication network may include a personal area network, a local area network, a wide area network, or a combination thereof.

Sensor management may include deactivating the remote sensor mode at 1250. Sensor management may include obtaining and/or storing sensor measurements at the peripheral device at 1252. Sensor management may include communicating sensor measurement data from the peripheral device to the HMD device over the wired link at 1254.

Sensor management may include utilizing and/or storing the sensor measurement data received from the peripheral device at the HMD device at 1256. Here, an electronic control system of the HMD device may receive communications transmitted by the peripheral device over a wired link via the electronic connector, and may store sensor measurement data included in the communications received from the peripheral device in a data storage device of the HMD device and/or may utilize the measurement data at the HMD device. Utilizing the measurement data may include varying an operation of the HMD device based on the measurement data and/or processing the measurement data at the HMD device into a processed form of such data. In at least some implementations, measurement data received at the HMD device from the peripheral device over a wired link via the electronic connector may include sensor measurements previously obtained by one or more sensors of the peripheral device while the peripheral device was in the undocked configuration.

As a non-limiting example, the measurement data may take the form of one or more images captured by a camera of the peripheral device. An electronic control system of the HMD device receives the measurement data that includes or represents the one or more images from the peripheral device over a wired link via the electronic connector, optionally stores, and optionally presents the one or more images via the see-through display of the HMD device.

Sensor management may include communicating the sensor measurement data or processed forms thereof from the HMD device to a remote computing system at 1258. This measurement data may include measurement data obtained via sensors located on-board the HMD device and/or measurement data received from the peripheral device over a wireless or wired communication link. Here, an electronic control system of the HMD device may transmit the measurement data via a wireless interface or a wired interface of the HMD device to the remote computing system, either directly or via a communication network. The communication network may include a personal area network, a local area network, a wide area network, or a combination thereof.

AR view management may include activating an optical signaling protocol for user state identification at 1270. AR view management may include deactivating the optical signaling protocol of a peripheral device tracking mode for tracking the peripheral device at 1272. As part of this peripheral device tracking mode, a control system of the peripheral device may deactivate the optical signaling protocol for tracking the peripheral device in the docked configuration. This peripheral tracking mode will be described in further detail with reference to FIG. 16.

AR view management may include presenting graphical AR content at the HMD device at 1274. Graphical AR content may include one or more AR objects aligned with physical real-world objects within the see-through graphical display of the HMD device. While the HMD system is, at times, described as presenting AR content via a see-through display, it will be understood that this AR content may alternatively or additionally take the form of non-aligned HUD content. AR view management may include updating an AR view of the HMD device responsive to and/or based on the sensor measurement data and/or user input data at 1276. This data may originate at HMD device and/or the peripheral device, depending on implementation and context.

Figure 13:
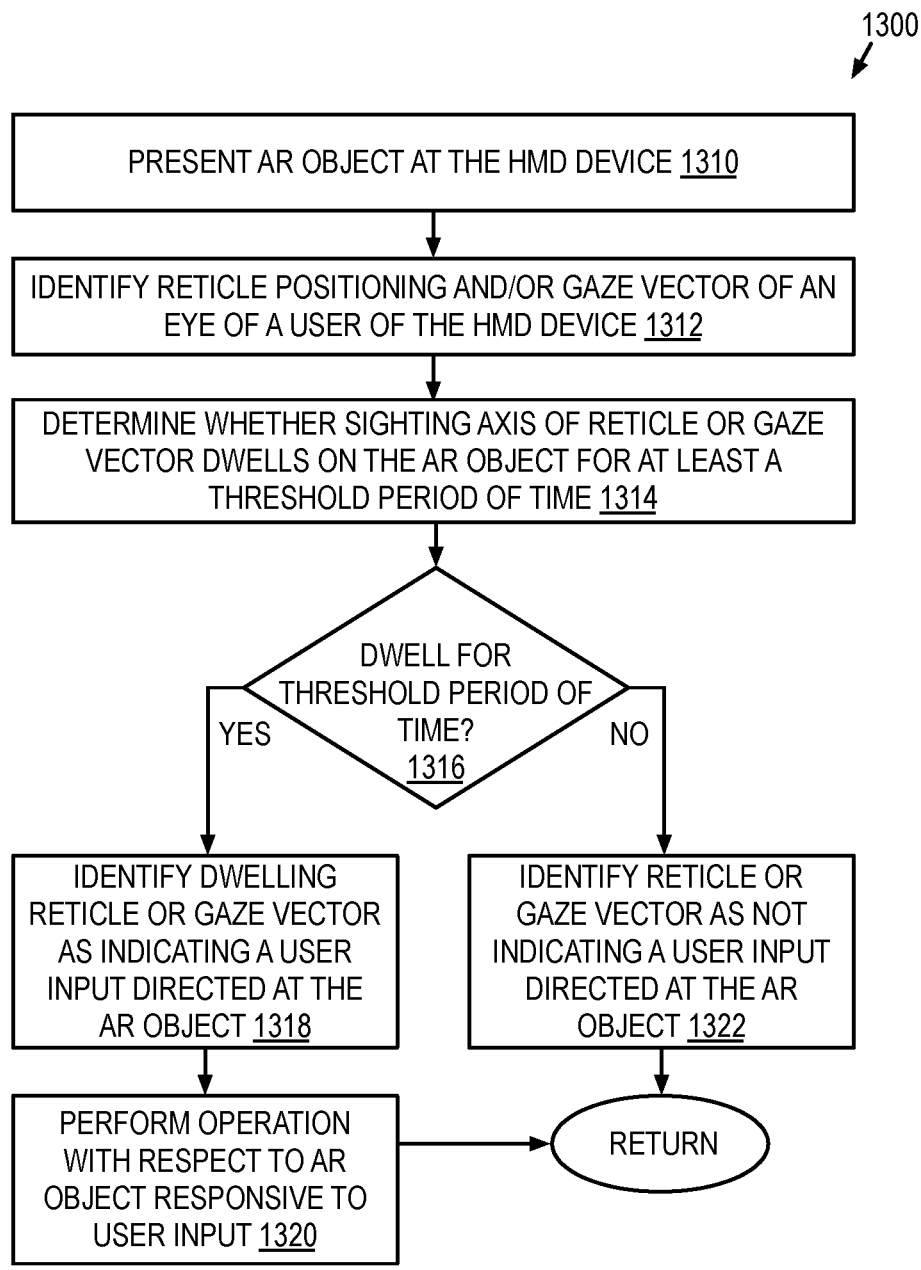
FIG. 13 is a flow diagram depicting an example method associated with a dwell mode of operation for user input to an HMD system.

FIG. 13 is a flow diagram depicting an example method 1300 associated with a dwell mode of operation for user input to an HMD system. Upon activation of the dwell mode, the HMD device or the HMD system is directed to perform method 1300. As previously described with reference to FIG. 12, the dwell mode may be programmatically activated in the docked configuration, and programmatically deactivated in the undocked configuration between the HMD device and the peripheral device.

At 1310, the method includes presenting an AR object within an AR view at the HMD device via a see-through display of the HMD device. FIG. 8 depicts an example of AR objects presented within an AR view via a see-through display of an HMD device. While these AR objects are presented within the context of being aligned with the peripheral device, other AR objects may be aligned with other real-world objects that do not include the peripheral device using the same or different techniques. Furthermore, while method 1300 is described with regards to an AR object, the method may also be applied to non-aligned HUD content presented via a see-through display of the HMD device, such as previously described with reference to FIG. 8, for example.

At 1312, the method includes identifying a reticle positioning and/or a gaze vector of an eye of the user of the HMD device. The reticle positioning and/or the gaze vector may be identified by the HMD device or HMD system based on sensor measurements obtained from sensors located on-board the HMD system, typically the HMD device. For the reticle positioning, these sensor measurements may include a geographic location and/or 6DOF positioning of the HMD device measured via geo-positioning sensors and/or inertial sensors of the HMD device. For the gaze vector, these sensor measurements may include the user's eye orientation measured via an ocular camera of the HMD device.

In addition to the above sensor measurements, reticle positioning may be further identified by the HMD device or HMD system based on a known spatial relationship between the reticle and a graphical display region of the see-through display. For example, the HMD device displays AR objects at defined coordinates (e.g., pixels) within the graphical display region of the see-through display. Within the context of an AR view, the HMD device defines the coordinates for display of the AR objects to be aligned with a coordinate system of the real-world environment to provide the appearance of the AR objects being present within the real-world environment. Based on this known spatial relationship between the reticle and the graphical display region, the HMD device or HMD system determines whether a sighting axis (e.g., central point) of the reticle is aimed at the AR object or other HUD object at a particular instance in time. By the user changing a 6DOF positioning of the HMD device, such as by turning or tilting the user's head, the see-through display is updated to reflect movement of the AR object within the AR view and field of view of the user, thereby causing the reticle to move relative to the AR objects.

By contrast, the gaze vector may be identified by the HMD device imaging the eye of the user via an ocular camera of the HMD device. As an example, the ocular camera includes an infrared (IR) camera and associated IR source (alternatively or additionally a visible light camera) directed rearward towards an eye of the user. The ocular camera may be configured to capture images of the eye of the user, including specific eye components such as the retina, iris, pupil, etc. An electronic control system of the HMD device may receive one or more images of the eye or eye components continuously or at periodic intervals, and process those images to identify an orientation of the eye which can be represented as a gaze vector. As a non-limiting example, the IR source creates a reflection on the pupil, the cornea, or other portion of the user's eye, which is captured by the ocular camera for analysis by the HMD device. Computer vision may be implemented by the HMD device to detect these reflections and other features of the eye. The position of the eye features may be measured relative to the reflections formed on the eye by the IR source. The relative positioning of the reflections compared to the eye features and/or the relative positioning between two or more reflections (e.g., on the pupil and the cornea) may be used by the HMD device to determine the gaze vector of the user.

At 1314, the method includes determining whether the sighting axis of the reticle or the gaze vector dwells on the AR object for at least a threshold period of time. As a non-limiting example, the threshold period of time may refer to a fraction of a second in duration, one or more seconds in duration, or greater than one second in duration, depending on implementation. This threshold period of time may be user selectable in some implementations and/or may be programmatically set by the HMD device depending on context.

In at least some implementations, a momentary shift of the reticle positioning or the gaze vector of any duration from the AR object back to the AR object may restart a timer for judging a duration of the dwell upon the AR object. In another implementation, a momentary shift of the reticle positioning or the gaze vector from the AR object of a duration that is less than a shorter time threshold may be filtered from the data such that the momentary shift is disregarded, thereby continuing the timer for judging a duration of a dwell upon the AR object.

At 1316, if the sighting axis of the reticle or the gaze vector is determined to have dwelled on the AR object for at least the threshold period of time, the process flow proceeds to 1318. At 1318, the method includes identifying the dwelling sighting axis or gaze vector as indicating a user input directed at the AR object. As an example, an electronic control system of the HMD device may direct the user input to a software component responsible for managing the AR object and associated content. The user input, upon being received by the software component may instruct the electronic control system of the HMD device to perform an operation associated with the AR object as indicated, for example, at 1320. An association between an AR object and a particular operation may be defined by an operating system or application program executed by the electronic control system of the HMD device. This association may be varied depending on context to perform a variety of different operations, such as initiate the display additional content, discontinue the display of content, summon a menu, perform a selection, implement a function, etc.

At 1316, if the sighting axis of the reticle or the gaze vector is not determined to have dwelled on the AR object for at least the threshold period of time, the process flow proceeds to 1322. At 1322, the sighting axis of the reticle or the gaze vector is not identified as indicating a user input directed at the AR object. From 1322, the process flow may return to any of the previous operations, such as to continue monitoring the reticle positioning or gaze vector for a dwell period that exceeds the time threshold for a given AR object presented by the HMD device.

As previously described with reference to FIG. 11, the dwell mode may be deactivated in the undocked configuration in which the HMD does not identify the sighting axis or the reticle or the gaze vector dwelling upon the AR object for at least the threshold period of time as indicating the user input directed at the AR object. Within this context, a user may use alternative user input interfaces to make selections or otherwise direct user input to AR objects.

Figure 14:
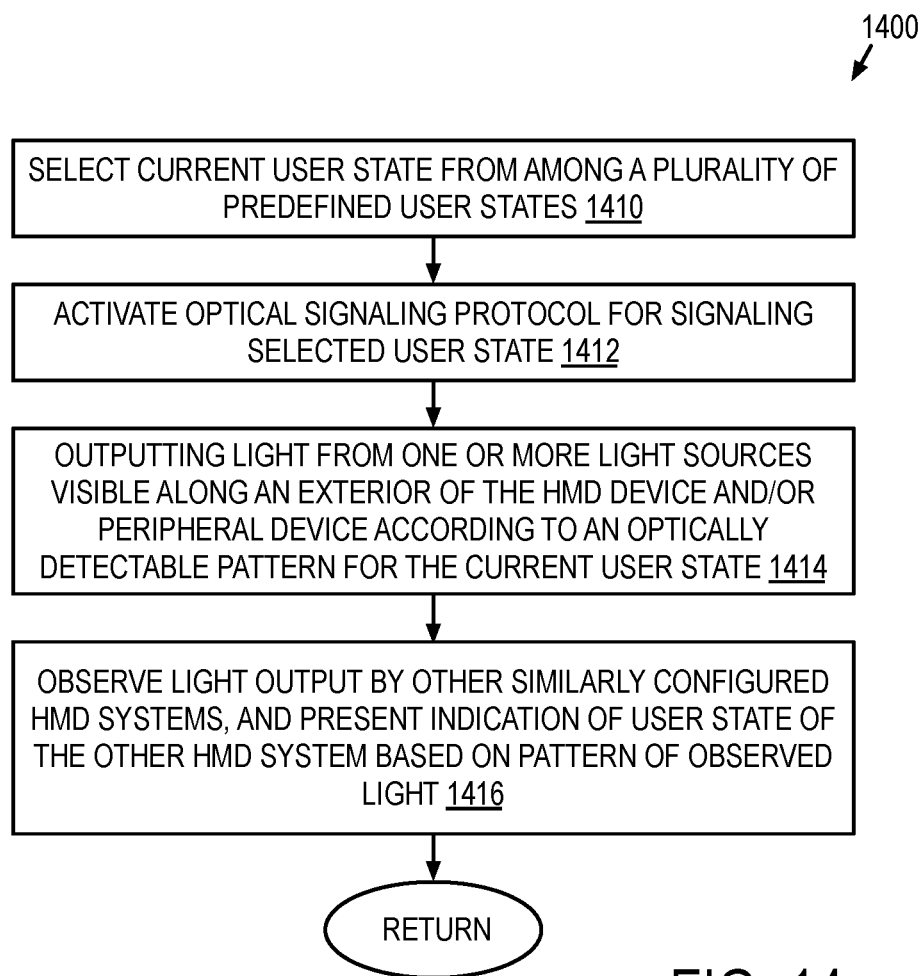
FIG. 14 is a flow diagram depicting an example method associated with an optical signaling mode of operation for communicating user state.

FIG. 14 is a flow diagram depicting an example method 1400 associated with an optical signaling mode of operation for communicating user state. As previously described with reference to FIG. 12, an optical signaling protocol of the optical signaling mode for communicating user state may be activated in the docked configuration at the HMD device and/or the peripheral device of the HMD system.

At 1410, the method includes selecting a current user state for the user wearing the HMD device from among a plurality of predefined user states. As an example, a data storage device of the HMD device and/or the peripheral device may include a plurality of predefined user states. Predefined user states selectable by the HMD system may include two, three, four, five, or more user states in an example. In at least some implementations, three or more predefined user states may exist along a user state continuum, such as to indicate varying degrees of a user state parameter. Examples of such user states include a busy state (e.g., indicating a do not disturb user preference) and a non-busy state (e.g., indicating that communications or contacts with the user are acceptable), or a docked state representing the docked configuration and an undocked state representing the undocked configuration between the peripheral device and the HMD device.

The current user state may be selected by the HMD system responsive to user input (e.g., a user-defined setting) or programmatically selected by the HMD system based on one or more operating conditions detected by the HMD system. Such operating conditions may include or may be based on (1) one or more biometric measurements obtained from the user, such as the user's brain activity measured via one or more EEG sensors of the HMD device, the user's pulse or heart rate measured via one or more ECG sensors of the HMD device, the user's pupil diameter of an eye of the user measured via one or more ocular cameras of the HMD device; (2) a geographic location and/or positioning of the HMD device measured via geo-positioning sensors and/or inertial sensors of the HMD device; (3) an attribute of AR objects or other HMD objects graphically presented to the user via the HMD device; (4) an attribute of physical objects of the real-world environment present within a field of view of a forward facing camera of the HMD device or a camera of the peripheral device; (5) whether a gaze vector of the user or a reticle of the HMD device is currently targeting or aiming at an AR object or other HMD object graphically presented to the user via the HMD device; (6) whether a gaze vector of the user or a reticle of the HMD device is currently targeting or aiming at a physical object of the real-world environment having a particular attribute; (7) whether the user is presently engaged in a conversation as detected via audio sensors of the HMD system or otherwise inferred from an active voice communications session established at the HMD system with a remote device; (8) whether the peripheral device is in the docked or undocked configuration with regards to the HMD device, among other suitable operating conditions. The HMD system, including the HMD device and/or the peripheral device, may continuously or periodically monitor the operating conditions, enabling the HMD system to detect changes to the operating conditions as well as user-defined settings that drive the selection of the current user state at 1410.

At 1412, the method includes activating an optical signaling protocol for signaling the selected user state. The optical signaling protocol directs the HMD device and/or the peripheral device to output light from one or more light source elements visible along an exterior of the HMD device and/or peripheral device according to an optically detectable pattern for the current user state. The optical signaling protocol defines the optically detectable pattern for each of the plurality of selectable user states, enabling the HMD system to select the appropriate pattern for the current user state.

At 1414, the method includes outputting the light from the one or more light source elements of the HMD device and/or the peripheral device according to the optically detectable pattern for the current user state. Each selectable user state may include a different optically detectable pattern. In at least some implementations, the HMD device and the peripheral device communicate the same user state in the docked configuration via the optically detectable pattern that corresponds to that user state. Non-limiting examples of optically detectable patterns will be described in further detail with reference to FIG. 17. In at least some implementations, in an undocked configuration, the HMD device may optically communicate the selected user state, whereas the peripheral device may discontinue optically communicating the user state. In these implementations, the peripheral device may transition to an optical signaling protocol for the HMD device to determine a positioning of the peripheral device or may discontinue optical signaling in any form.

At 1416, the method includes observing, at the HMD system, light output by other similarly configured HMD systems, and presenting an indication of user state of the other HMD system based on the pattern of the observed light. As an example, an electronic control system of the HMD device and/or the peripheral device of a first HMD system may image a real-world environment containing one or more similarly configured HMD systems or components. Light output by these other HMD system, such as previously described with reference to operation 1414, may be captured by the cameras of the first HMD system. The optical signaling protocol may be referenced by the electronic control system of the first HMD system to translate a pattern of observed light from the other HMD systems into a user state. The electronic control system of the first HMD system may present an indication of the user state of the other HMD system via an output device of the output subsystem, such as by displaying the indication of user state, outputting an audio indication of user state, providing a haptic feedback indicating the user state, etc.

In addition to or as alternative to the above techniques, an optically detectable pattern selected from among a plurality of patterns of an optical signaling protocol may be varied at the peripheral device and/or the HMD device responsive to the peripheral device being in the docked configuration or the undocked configuration with the HMD device. For example, a first pattern may be used to identify the peripheral device as being docked with the HMD device, and a second pattern performed at the peripheral device may be used by the HMD device to identify a positioning of the peripheral device in the undocked configuration. Here, the optical signaling protocol directs the peripheral device to output light from one or more light source elements visible along the exterior of the peripheral device according to the optically detectable pattern defined by the optical signaling protocol selected by the HMD system.

Additionally or alternatively, an optical signaling protocol of the optical signaling mode for communicating user state may be activated at the HMD device in the undocked configuration (in contrast to previously described operation 1170 of FIG. 11) while being deactivated at the peripheral device. As an example, an optical signaling protocol may be activated in the undocked configuration that directs an electronic control system of the HMD device to output light from one or more light source elements visible along an exterior of the HMD device according to an optically detectable pattern defined by the optical signaling protocol. This user state signaling by the HMD device may be performed alongside optical signaling by the undocked peripheral device according to an optical signaling protocol for peripheral device tracking. Upon docking the peripheral device with the HMD device, the peripheral device may transition from the optical signaling protocol for peripheral device tracking to an optical signaling protocol for communicating user state (alongside continued optical signaling by the HMD device), or alternatively optical signaling may be discontinued at the peripheral device upon docking with the HMD device.

From any of operations 1414/1416, the process flow of method 1400 may return to 1410 to select the current user state based on changes to operating conditions and/or user-defined selections. As previously described, the HMD system, including the HMD device and/or the peripheral device, may continuously or periodically monitor the operating conditions, enabling the HMD system to detect changes to the operating conditions as well as user-defined settings that drive the selection of the current user state at 1410.

FIG. 15 depicts additional aspects of an HMD device 1500. HMD device 1500 is a non-limiting example of previously described HMD device 110 of FIG. 1. Within FIG. 15, HMD device 1500 is presented in a head-on view in contrast to the side view of HMD device 110 depicted in FIG. 1. HMD device 1500 again takes the form of a helmet having a visor in this example. Here, a helmet 1502 of HMD device 1500 may include a variety of sensors such as forward facing camera 1508 and/or audio sensors 1510 (e.g., provided at the front, back, and/or a top section 1506 of helmet 1502). See-through display panels 1512 are separate from or independent of visor 1504 in this example, and are mounted to helmet 1502 via a frame 1514. Helmet 1502 further includes rearward facing ocular cameras 1511 mounted thereon. Each ocular camera 1511 is directed to a respective eye of the user to capture an image of the iris, retina, pupil, or other eye components. Each ocular camera 1511 may be positioned on helmet 1502 above and/or to the side of each eye, and facing a corresponding eye. Helmet 1502 also includes EEG/ECG sensors 1516 to measure brain activity and heart rate pattern of the user, in this example. Helmet 1502 also includes light source elements in the form of LED lights 1513 on each side of the helmet 1502. As previously described with reference to optical signaling protocols, light source elements may be operated by the HMD system to visually communicate user state to other devices, such as similarly configured HMD devices worn by other users, for example.

Figure 16:
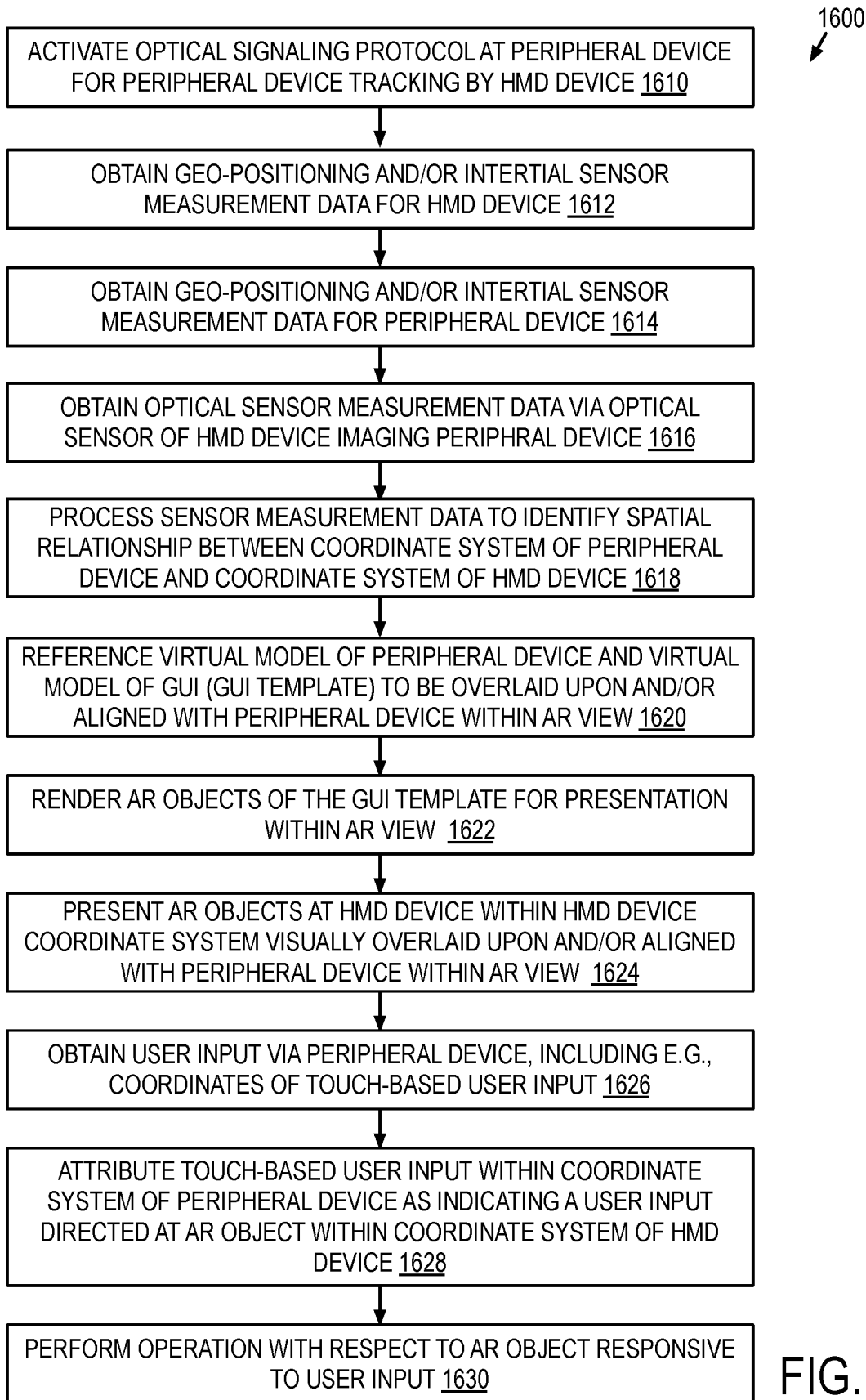
FIG. 16 is a flow diagram depicting an example method associated with presenting, via an HMD device, AR objects that are visually overlaid upon and/or aligned with a peripheral device within an AR view.

FIG. 16 is a flow diagram depicting an example method 1600 associated with presenting, via an HMD device, AR objects that are visually overlaid upon and/or aligned with a peripheral device within an AR view. As previously described with reference to FIGS. 8 and 11, a peripheral device may be operated in a remote control mode in which the peripheral device is in an undocked configuration with an HMD device. The positioning of the peripheral device in 6DOF may be identified by an HMD device when the peripheral device is in an undocked configuration. When the peripheral device is brought into a field of the view of the user viewing the peripheral device via a see-through display of the HMD device, the HMD device may present AR objects that are visually overlaid upon and/or aligned with the peripheral device, a non-limiting example of which is depicted in FIG. 8. At least some of the AR objects may take the form of graphical user interface (GUI) elements that are selectable by the user to direct the HMD device to implement a function or perform an operation associated with the selected AR object. Method 1600 or portions thereof may be performed by the HMD device, or collectively by the HMD device and peripheral device, depending on implementation.

At 1610, the method includes activating an optical signaling protocol at the peripheral device for peripheral device tracking by the HMD device. Operation 1610 is a non-limiting example of previously described operation 1172 of FIG. 11. For example, this optical signaling protocol for peripheral device tracking may be activated by an electronic control system of the peripheral device upon determining that the peripheral device is in an undocked configuration with the HMD device. Here, the optical signaling protocol for peripheral device tracking directs the peripheral device to output light from one or more light source elements visible along an exterior of the peripheral device according to an optically detectable pattern defined by the optical signaling protocol.

The optical signaling protocol for peripheral device tracking or other signaling modes (e.g., user state) may be stored within a data storage device of the peripheral device and within a data storage device of the HMD device. An electronic control system of the HMD device may reference the optical signaling protocol to identify the optically detectable pattern implemented by the peripheral device for a given mode of operation, thereby enabling the electronic control system of the HMD device to search within an individual image or a collection of time-sequenced images of the peripheral device for the presence of the optically detectable pattern. This optically detectable pattern may serve as a fiducial marker that assists the HMD device in determining a 6DOF positioning of the peripheral device relative to the HMD device based on images of the peripheral device captured by a camera of the HMD device.

At 1612, the method includes obtaining geo-positioning and/or inertial sensor measurement data for the HMD device. Here, the electronic control system of the HMD device receives sensor measurement data from geo-positioning sensor devices and/or inertial sensor devices located on-board the HMD device. This sensor measurement data may be used by the electronic control system of the HMD device to determine a positioning of the HMD device in 6DOF within the real-world environment. Examples of geo-positioning and inertial sensor devices are described in further detail with reference to FIG. 10. In some implementations, operation 1612 may be omitted, such as where optical detection of the 6DOF positioning of the peripheral device is sufficient without geo-positioning/inertial sensor measurements to present AR objects overlaid upon and/or align with the peripheral device.

At 1614, the method includes obtaining geo-positioning and/or inertial sensor measurement data for the peripheral device. Here, the electronic control system of the peripheral device receives sensor measurement data from geo-positioning sensor devices and/or inertial sensor devices located on-board the peripheral device. Depending on implementation, this sensor measurement data may be used by the electronic control system of the peripheral device or by the electronic control system of the HMD device (e.g., based on the sensor measurement data communicated by the peripheral device to the HMD device) to determine a positioning of the peripheral device in 6DOF within the real-world environment. In undocked configurations, the peripheral device may communicate sensor measurement data in raw or processed forms and/or a 6DOF positioning of the peripheral device to the HMD device via a wireless link. Examples of geo-positioning and inertial sensor devices are again described in further detail with reference to FIG. 10. In some implementations, operation 1614 may be omitted, such as where optical detection of the 6DOF positioning of the peripheral device is sufficient without geo-positioning/inertial sensor measurements to present AR objects visually overlaid upon and/or aligned with the peripheral device within the AR view.

At 1616, the method includes obtaining optical sensor measurement data via an optical sensor of the HMD device imaging the peripheral device via a camera. Here, the electronic control system of the HMD device may obtain optical sensor measurement data in the form of one or more images of the peripheral device from an on-board camera, such as previously described optical sensor devices of FIG. 10. This on-board camera may refer to forward facing cameras 150 of FIG. 1 or 1508 of FIG. 15, for example. The one or more images of the peripheral device captured by the HMD device may include the optically detectable patterns provided by the light source elements of the peripheral device, performed at 1610. For implementations in which the optical signaling protocol defines a time-based sequence of optically detectable patterns (e.g., light source elements operated in a blinking mode), optical sensor measurement data may include a collection of time-sequenced images of the peripheral device.

At 1618, the method includes processing the sensor measurement data obtained at 1612, 1614, 1616, etc. to identify a spatial relationship between a coordinate system of the peripheral device and a coordinate system of the HMD device. For example, the geo-positioning and/or inertial sensor measurement data obtained for the HMD device at 1612 may be processed by the electronic control system of the HMD device to determine a 6DOF positioning of the HMD device within a coordinate system of the HMD device. The geo-positioning and/or inertial sensor measurement data obtained for peripheral device at 1614 may be processed at the peripheral device or at the HMD device into a 6DOF positioning of the peripheral device within a coordinate system of the peripheral device or within a translated coordinate system (e.g., the coordinate system of the HMD device). Depending on implementation, the electronic control system of the HMD device may translate the 6DOF positioning of the peripheral device and/or the 6DOF positioning of the HMD device (or the underlying data representing the 6DOF positioning) into a common coordinate system. This translation operation may be performed by the electronic control system of the HMD (or alternatively the peripheral device) referencing a translation function stored within a data storage device, and applying that translation function to the measurement data obtained at 1612 and/or 1614 to determine the spatial relationship of the peripheral device relative to the HMD device. The spatial relationship of the peripheral device relative to the HMD device may take the form of a translated 6DOF positioning of the peripheral device within the coordinate system of the HMD device.

The electronic control system of the HMD device may utilize the optical sensor measurement data obtained at 1616 in combination with the geo-positioning and/or inertial sensor measurement data obtained at 1612 and/or 1614 to further resolve or improve an estimate of the 6DOF positioning of the peripheral device within the coordinate system of the HMD device. For example, the electronic control system of the HMD, at 1620, may reference a virtual model of the peripheral device that may be used in combination with the optical sensor measurements obtained at 1616 to determine a second estimate of the 6DOF positioning of the peripheral device. The virtual model of the peripheral device may include mapping information that is keyed to physical features of the actual peripheral device.

For example, the electronic control system of the HMD device may include a computer vision engine that performs optical analysis of images captured via the camera to recognize and extract features of the peripheral device (e.g., including a positioning of the illuminated light source elements), from the optical sensor measurement data, and assigns those features to the virtual model of the peripheral device. This computer vision engine may have been previously trained by software developers on images of similarly configured instances or versions of the peripheral device. The virtual model of the peripheral device may include the location of each light source element on-board the peripheral device, among other optically detectable features of the peripheral device such as edges, corners, or other fiducial markers, which are then mapped by the computer vision engine to images of the peripheral device obtained at 1616. The virtual model of the peripheral device may define relative spatial dimensions of the peripheral device, including between or among the various light source elements or other features to enable the HMD device to estimate a 6DOF positioning of the peripheral device from the optical sensor measurement data. This 6DOF positioning estimate is typically within the coordinate system of the HMD device for implementations in which the on-board camera has a fixed positioning relative to the HMD device.

The two estimates of the 6DOF positioning obtained from optical sensor measurement data and geo-positioning/inertial sensor measurement data may be combined into a blended or average 6DOF positioning that identifies the spatial relationship between the peripheral device and the HMD device. For example, if a physical appearance or configuration of the peripheral device has multiple potential orientation states for a given set of optical observations, inertial sensor measurement data may enable the HMD device to select the correct orientation state for the peripheral device—e.g., based on a measured orientation of the peripheral device relative to a gravity vector. Weighted averaging may be used in some examples based on confidence values assigned to each estimate. Alternatively, one of these two 6DOF positioning estimates may be discarded by the HMD device. Here, the remaining 6DOF positioning estimate may identify the spatial relationship between the peripheral device and the HMD device.

Also at 1620, the method includes referencing a virtual model of a graphical user interface (GUI) to be visually overlaid upon and/or aligned with the peripheral device within an AR view to be presented at the HMD device. This virtual model of the GUI may be stored in a data storage device of the HMD device. In some implementations, the virtual model of the GUI may include a collection of GUI elements arranged within two or three-dimensional space. These GUI elements may take the form of user input elements (i.e., selectors) that are tied to specific functions, actions, or operations. Alternatively or additionally, these GUI elements may take the form of information output elements that are tied to specific sources of information to be output to the user. This virtual model of the GUI may be referred to as a GUI template, and may be defined by an operating system of the HMD device or by an application program executed by the electronic control system of the HMD device. The GUI template may be context specific, and may be varied (e.g., between or among a plurality of different GUI templates) based on the application program or operating conditions of the HMD system.

Each GUI element may be associated with a respective AR content object to be visually overlaid upon and/or aligned with the peripheral device at the location of the GUI element within the GUI template. These AR objects may be stored within a data storage device of the HMD device, and may be defined by the operating system or by an application program executed by the HMD device. The AR objects associated with the GUI template may be context specific, and may be varied (e.g., between or among a plurality of different AR objects) based on the application program or operating conditions of the HMD system.

At 1622, the method includes rendering one or more AR objects of the GUI template for presentation within the AR view. The GUI template and its GUI elements referenced at 1620 may further include associated mapping information that enables the HMD device to align the GUI template with the virtual model of the peripheral device. For example, as depicted in FIG. 8, AR objects are arranged radially about a face of the peripheral device, as defined by the GUI template and associated mapping to the virtual model of the peripheral device.

The electronic control system of the HMD device may include a rendering engine that renders the AR objects at various locations within the GUI template corresponding to their associated GUI elements. The rendering engine may set the 6DOF positioning of the virtual model of the peripheral device to the 6DOF positioning estimate for the actual peripheral device obtained at 1618. Alignment of the virtual model of the peripheral device to the estimated positioning of actual peripheral device provides the visual appearance that the AR objects are visually overlaid upon and/or aligned with features of the actual peripheral device within the see-through display. The rendering engine outputs display information that includes the AR objects rendered at respective display coordinates of the see-through display.

At 1624, the method includes presenting the one or more AR objects within an AR view via the see-through display of the HMD device within the coordinate system of HMD device. Here, the one or more AR objects are visually overlaid upon and/or aligned with the peripheral device within the AR view at display coordinates of the see-through display that are based on the spatial relationship identified between the coordinate systems of the peripheral device and HMD device. FIG. 8 depicts a non-limiting example in which AR objects are overlaid upon and aligned with the peripheral device within an AR view.

At 1626, the method includes obtaining user input via a user input interface of the peripheral device. For example, the user input may include an indication of the coordinates of a touch-based user input at a touch-sensitive user input interface (e.g., capacitive touch-sensitive face or surface) of the peripheral device. Additionally or alternatively, the user input may include actuation of a button that corresponds to selection of the AR object targeted by the user via a touch-based input or optically via a gaze vector or sighting axis of a reticle.

At 1628, the method includes attributing the touch-based user input within the coordinate system of the peripheral device as indicating a user input directed at an AR object within the coordinate system of the HMD device. Here, the electronic control system of the HMD device may translate the coordinates of the touch-based user input within the coordinate system of the peripheral device to the coordinate system of the HMD device, based on the spatial relationship identified at 1618, for example. These coordinates, when underlying an AR object, may be translated by the HMD device as being directed at or to the AR object, and associated functions, operations, etc.

At 1630, the method includes performing an operation with respect to the AR object responsive to the user input. Here, the HMD device performs an operation associated with an AR object that is targeted by the touch-based user input within the coordinate system of the HMD device. As previously described with reference to operation 1320 of FIG. 13, an association between an AR object and a particular operation may be defined by an operating system or application program executed by the electronic control system of the HMD device. This association may be varied depending on context to perform a variety of different operations, such as initiate the display additional content, discontinue the display of content, summon a menu, perform a selection, implement a function, etc.

Figure 17:
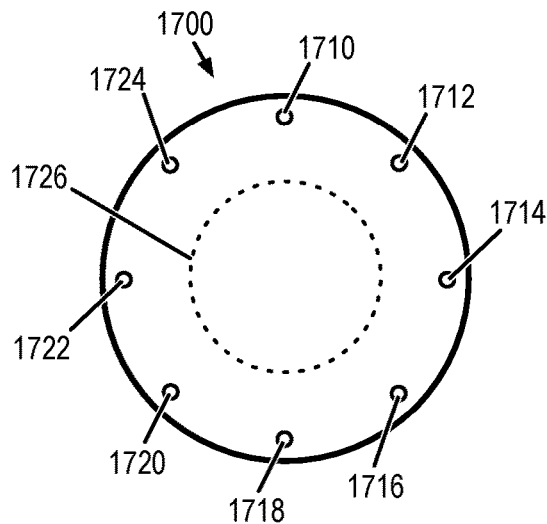
FIG. 17 depicts examples of optically detectable patterns defined by an optical signaling protocol.

FIG. 17 depicts examples of optically detectable patterns defined by an optical signaling protocol. As previously described, an optical signaling protocol may be used within the context of user state signaling or peripheral device tracking. An example peripheral device 1700 is depicted in FIG. 17 as including a plurality of a light source elements 1710-1724. Peripheral device 1700 is a non-limiting example of previously described peripheral device 300 of FIG. 3. While light source elements 1710-1724 are described within the context of a peripheral device, in other examples, some or all of these light source elements may reside on-board an HMD device, such as described with reference to FIG. 15, for example.

Light source elements 1710-1724, in this example, have a fixed position relative to each other. A collection of light source elements, such as 1710-1724, may be referred to as a constellation of light source elements that is optically detectable by the HMD device or other device via an on-board camera. Light source elements 1710-1724 may take the form of LEDs in an example. The frequency spectrum of light produced by light source elements 1710-1724 may include IR and/or a range of visible light spectrums.

As previously described with reference to FIG. 16, the HMD device may be programmed with or may otherwise reference a virtual model of the peripheral device from a data storage device that describes a spatial relationship of these light source elements of the peripheral device. Because the light source elements have a fixed position relative to each other, the HMD device being programmed with this spatial relationship is able to determine a 6DOF positioning of the peripheral device within three-dimensional space.

Physical objects present within the real-world environment, such as a user's hand or finger, for example, may occasionally reside between the camera of the HMD device and one or more of the light source elements, thereby occluding the optical signaling paths for the occluded light source elements while in the undocked state. Alternatively or additionally, one or more light source elements of the peripheral device may reside outside a field of view of the camera of the HMD device or other device imaging the light source elements. In each of these scenarios, two or more light source elements that are visible within a field of view of the camera of the HMD device may be sufficient for the HMD device to determine the 6DOF positioning of the peripheral device relative to the HMD device. However, where a sufficient quantity and/or configuration of these light source elements are not within the field of view of the camera for the HMD device to determine the identity of the respective light source elements, the 6DOF positioning of the peripheral device may take one of a plurality of potential states. To enable the HMD device to identify the actual 6DOF positioning of the peripheral device from among a plurality of potential states, the optical signaling protocol may define different properties for some or all of the light emitting elements that enables light emitting elements to be visually distinguished from each other. Non-limiting examples of these properties include (1) an "on" state vs. "off" state, (2) a brightness or intensity of light at a specific frequency spectrum or range, (3) a frequency at which the light blinks (i.e., is switched between "on" and "off" states), (4) a duration of the "on" state vs. "off" state for each blinking period, (5) frequency or frequency range of the light spectrum emitted by the light source elements.

A variety of different optically detectable patterns may be implemented by a peripheral device to assist in peripheral device tracking by the HMD device, or may be implemented by the peripheral device and/or HMD device to provide user state signaling to other devices. A table 1730 is also depicted in FIG. 17 that includes a variety of example optically detectable patterns 1740-1752 that may be provided, for example, by peripheral device 1700 via light source elements 1710-1724.

Pattern 1740, for example, includes each of light source elements 1710-1724 being operated in a light emitting state (i.e., an "on" state), such that all light source elements are emit light that is observable by the HMD device. By contrast, pattern 1742 refers to all light source elements 1710-1724 being in an "off" state in which no light is emitted by any of the light source elements. Pattern 1744 includes some light source elements (e.g., 1710, 1714, 1718, 1722) being operated in an "on" state, and other light source elements (e.g., 1712, 1716, 1720, 1724) being in an "off" state.

Pattern 1746 refers to light source elements 1710-1724 being operated in a blinking state having a first frequency "X". A blinking state refers to a time-based sequence of an "on" state and an "off" state, each having a corresponding duration. Within this context, the first frequency may refer to a frequency (e.g., in Hz) by which the "on" state or "off" state is activated. Pattern 1748 refers to light source elements 1710-1724 being operated in a blinking state having a second frequency "Y" that differs from frequency "X" (e.g., a frequency of a different Hz). Pattern 1750 includes some light source elements (e.g., 1710, 1714, 1718, 1722) being operated in a blinking state having a first frequency, and other light source elements (e.g., 1712, 1716, 1720, 1724) being operated in a blinking state having a second frequency that differs from the first frequency. Pattern 1752 refers to an example in which some light source elements are operated in an "on" state, other light source elements are in an "off" state, other light source elements are operated in a blinking state having a first frequency, and still other light source elements are operated in a blinking state having a second frequency that differs from the first frequency.

In an example, user state signaling may be implemented by the HMD device and/or peripheral device outputting the same optically detectable pattern via each of their respective light source elements, such as depicted in patterns 1740, 1746, 1748, etc. Here, a frequency of a blinking mode at each light source element may be used to refer to a particular user state of the plurality of user states, such that each user state is associated with a different frequency. By contrast, peripheral device tracking in this example, may include different frequencies of a blinking mode being output by each light source element of the peripheral device to enable the HMD device to visually identify and distinguish individual light source elements from each other based on their respective frequencies.

While at least some of the examples described herein include the use of optical signaling at the peripheral device for tracking the peripheral device or indicating user state, in some implementations, optically detectable patterns may convey both user state information for reception by other HMD devices, while also being used for tracking of the peripheral device.

Referring again to peripheral device 1700, in some implementations, exterior surfaces of the peripheral device may include physical markings, depicted schematically at 1726 on a front face of the peripheral device. These physical markings may be used as an alternative to or in addition to optical signaling by light source elements for peripheral device tracking. For example, these physical markings may take the form of a fiducial marker that assists the HMD device in determining a 6DOF positioning of the peripheral device, including distance and/or orientation of the peripheral device relative to the HMD device.

It is to be understood that the configurations and/or approaches described herein are exemplary in nature, and that these examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof. It should be understood that the disclosed embodiments are illustrative and not restrictive. Variations to the disclosed embodiments that fall within the metes and bounds of the claims, now or later presented, or the equivalence of such metes and bounds are embraced by the claims.

The invention claimed is:

1. A head-mounted display (HMD) system, comprising:
a HMD device comprising a camera; and
a peripheral device dockable to the HMD device, the peripheral device comprising:
a plurality of light source elements disposed along a perimeter of a face of the peripheral device; and
a peripheral electronic control system comprising instructions that, when executed by one or more processors of the peripheral electronic control system, cause the peripheral electronic control system to perform operations comprising:
forming an optically detectable light pattern with the plurality of light source elements by controlling each of the light source elements, the HMD device being configured to detect the optically detectable light pattern with the camera and to display an augmented reality (AR) content based on the identified optically detectable light pattern.

2. The HMD system of claim 1, wherein the plurality of light source elements includes a plurality of infrared light emitting diodes located on a front face or a side surface of the peripheral device.

3. The HMD system of claim 2, wherein each infrared light emitting diode has different angular spacing with one another infrared light emitting diode.

4. The HMD system of claim 1, wherein controlling each of the light source element comprises controlling a combination of an on state, an off state, a frequency, and a frequency range of the light spectrum emittable by each light source element.

5. The HMD system of claim 1, wherein the HMD device is configured to:
determine a spatial relationship between a coordinate system of the peripheral device and a coordinate system of the HMD device based on a captured image of the optically detectable light pattern from the camera of the HMD device; and
present one or more augmented reality (AR) objects in a display of the HMD device in which the one or more AR objects are visually overlaid upon and aligned with the peripheral device at display coordinates that are based on the spatial relationship identified between the coordinate systems of the peripheral device and the HMD device.

6. The HMD system of claim 1, wherein the camera of the HMD device detects a portion of the plurality of light source elements, wherein the HMD device identifies the optically detectable light pattern based on the portion of the plurality of light source elements.

7. The HMD system of claim 1, wherein the operations further comprise:
identify a user state of the HMD device; and
generate the optically detectable light pattern corresponding to the identified user state.

8. The HMD system of claim 7, further comprising:
a second HMD device comprising a further camera for generating an image of the optically detectable light pattern, the second HMD device configured to:
retrieve the user state associated with the HMD device based on the optically detectable light pattern; and
display, in a second display of the HMD device, a second AR content corresponding to the user state associated with the HMD device.

9. The HMD system of claim 7, further comprising:
detect that the peripheral device is in a docked configuration with the HMD device; and
display the optically detectable light pattern with the plurality of light source elements in response to detecting that the peripheral device is in a docked configuration with the HMD device.

10. The HMD system of claim 1, wherein the HMD device comprises:
an HMD electronic control system,
a see-through graphical display operatively coupled to the HMD electronic control system to present graphical content,
a first electronic connector operatively coupled to the HMD electronic control system, and
a first wireless interface operatively coupled to the HMD electronic control system to at least receive wireless communications, wherein the peripheral device further comprises:
a second electronic connector operatively coupled to the peripheral electronic control system to establish a set of physical electronic connections with the first electronic connector of the HMD device in a docked configuration,
a second wireless interface operatively coupled to the peripheral electronic control system to at least transmit the wireless communication;
wherein the user input interface is operatively coupled to the peripheral electronic control system,
wherein the peripheral electronic control system is configured to transmit the wireless communication via the second wireless interface indicating the user input received via the user input interface for reception by the HMD device via the first wireless interface in the undocked configuration in which the set of physical electronic connections are not established between the first electronic connector and the second electronic connector.

11. The HMD system of claim 10, wherein the HMD instructions are further executable by the HMD electronic control system to:
select a current user state for the user wearing the HMD device from among a plurality of predefined user states, the current user state being selected responsive to user input or programmatically selected based on an operating condition detected by the HMD device;
activate an optical signaling protocol for signaling the user state in the docked configuration, the optical signaling protocol directing the HMD device and the peripheral device to output light from one or more light source elements visible along an exterior of the HMD device and/or peripheral device according to the optically detectable light pattern defined by the optical signaling protocol for the current user state; and
deactivate the optical signaling protocol for signaling the user state in the undocked configuration.

12. The HMD system of claim 10, wherein the AR content visually appears as a plurality of AR objects distributed along a perimeter of the face of the user input interface and forming a plurality of regions, each region providing a different corresponding visual indication of where to select and activate a different corresponding function implemented by the HMD device.

13. The HMD system of claim 12, wherein the user input interface includes a touch-sensitive user interface on the face of the peripheral device, and
wherein the peripheral electronic control system is configured to detect the user touching the user input interface within one of the plurality of regions that appears to be overlaid by one of the plurality of AR objects to initiate selection of the corresponding function of a region among the plurality of regions, the region corresponding to the overlaid AR object.

14. The HMD system of claim 13, wherein the user input interface includes a plurality of physical buttons corresponding to the plurality of regions,
wherein the peripheral electronic control system is configured to detect the user depressing one of the physical buttons that is overlaid by one of the plurality of AR objects to initiate selection of the corresponding function of a region among the plurality of regions, the region corresponding to the overlaid AR object.

15. The HMD system of claim 14, wherein the AR content visually appears as an AR window that extends outwards from the peripheral device, the AR window being aligned with an AR object selected by the user from the plurality of AR objects, the AR window including information related to the selected AR object.

16. The HMD system of claim 15, wherein the HMD is configured to modify the plurality of AR objects based on a type of information being displayed in the AR window, the modified plurality of AR objects being configured to provide functions corresponding to the type of information being displayed in the AR window.

17. The HMD system of claim 12, wherein the HMD electronic control system is programmed with HMD instructions executable by the HMD electronic control system to:
monitor a connection state of the set of physical electronic connections at the first and second electronic connector; and
determine whether the peripheral device is in the docked configuration or the undocked configuration based on the connection state of the set of physical electronic connections.

18. The HMD system of claim 1, wherein the AR content includes a three-dimensional model of a physical object, a motion of the three-dimensional model being manipulated based on the user input interface,
wherein the peripheral electronic control system is configured to access movement data from an Inertial Measurement Unit (IMU) sensor in the peripheral device and to transmit the movement data to a control system of the physical object associated with the three-dimensional model.

19. A method performed by a peripheral device of a head-mounted display (HMD) device wearable upon a head of a user, the method comprising:
forming an optically detectable light pattern with a plurality of light source elements disposed along a perimeter of a face of the peripheral device that is dockable to the HMD device; and
controlling each of the light source elements to form the optically detectable light pattern, the HMD device being configured to detect the optically detectable light pattern with a camera of the HMD device and to display, in a display of the HMD device, an augmented reality (AR) content based on the identified optically detectable light pattern.

20. A non-transitory computer-readable medium comprising instructions that, when executed by one or more processors of a machine, cause the machine to perform operations comprising:
forming an optically detectable light pattern with a plurality of light source elements disposed along a perimeter of a face of a peripheral device that is dockable to a head-mounted display (HMD) device; and
controlling each of the light source elements based on the optically detectable light pattern,
the HMD device being configured to detect the optically detectable light pattern with a camera of the HMD device and to display, in a display of the HMD device, an augmented reality (AR) content based on the identified optically detectable light pattern.

* * * * *